US009737986B2

(12) United States Patent
Hardouin et al.

(10) Patent No.: US 9,737,986 B2
(45) Date of Patent: Aug. 22, 2017

(54) RECONFIGURABLE ROBOTIC SYSTEM

(71) Applicant: SPIN MASTER LTD., Toronto (CA)

(72) Inventors: Christopher John Hardouin, Topanga, CA (US); Romeo Andres Garza, Culver City, CA (US); Felipe Jose Garza, Glendale, CA (US)

(73) Assignee: Spin Master Ltd., Toronto (CA)

( * ) Notice: Subject to any disclaimer, the term of this patent is extended or adjusted under 35 U.S.C. 154(b) by 0 days.

(21) Appl. No.: 15/420,674

(22) Filed: Jan. 31, 2017

(65) Prior Publication Data

US 2017/0136620 A1 May 18, 2017

Related U.S. Application Data

(62) Division of application No. 14/802,971, filed on Jul. 17, 2015, now Pat. No. 9,592,603.
(Continued)

(51) Int. Cl.
*G06F 19/00* (2011.01)
*B25J 9/08* (2006.01)
(Continued)

(52) U.S. Cl.
CPC ............... *B25J 9/08* (2013.01); *B25J 5/007* (2013.01); *B25J 13/003* (2013.01); *G05D 2201/0214* (2013.01)

(58) Field of Classification Search
CPC . B25J 9/0003; B25J 9/08; B25J 9/1602; B25J 9/1617; G05B 2219/40302; G05B 2219/40304
(Continued)

(56) References Cited

U.S. PATENT DOCUMENTS 5,511,147 A  4/1996 Abdel-Malek
5,675,229 A  10/1997 Thorne
(Continued)

FOREIGN PATENT DOCUMENTS

EP      923011 A1    6/1999
KR  101284910 B1   7/2013

OTHER PUBLICATIONS

Taira et al., "Design and Implementation of Reconfigurable Modular Humanoid Robot Architecture"; 2005 IEEE/RSJ International Conference on Intelligent Robots and Systems; Aug. 2-6, 2005; pp. 1071-1076; Edmonton, AB, Canada.
(Continued)

*Primary Examiner* — Harry Oh
(74) *Attorney, Agent, or Firm* — Millman IP Inc.

(57) ABSTRACT

In an aspect, a robotic system is provided and includes at least two digital servo modules, each of which includes a position-controlled motor and a position sensor for sensing a servo position, a plurality of building block elements that are connectable with the digital servo modules to create position-controlled joints of a robotic figure, at least two wheel modules enabling wheeled movement of the robotic figure and a central controller communicating with and controlling the digital servo modules and the wheel modules. The central controller operatively places a selected group of digital servo modules in a learned motion mode, wherein a corresponding group of position-controlled joints is enabled to be manually manipulated, and wherein each of the selected digital servo module periodically transmits servomotor position to the central controller. The central controller can steer the robotic figure wheel modules based on servo positions of the selected digital servo modules.

4 Claims, 16 Drawing Sheets

Related U.S. Application Data

(60) Provisional application No. 62/086,179, filed on Dec. 1, 2014.

(51) Int. Cl.
  *B25J 5/00*   (2006.01)
  *B25J 13/00*  (2006.01)

(58) Field of Classification Search
  USPC .......................................................... 700/245
  See application file for complete search history.

(56) References Cited

U.S. PATENT DOCUMENTS

| | | | | |
|---|---|---|---|---|
| 5,850,762 | A * | 12/1998 | Kochanneck | B25J 9/08 180/65.1 |
| 6,454,624 | B1 * | 9/2002 | Duff | A63H 33/042 414/915 |
| 6,575,802 | B2 * | 6/2003 | Yim | B25J 9/1617 446/484 |
| 6,605,914 | B2 * | 8/2003 | Yim | A63H 33/042 318/568.11 |
| 6,636,781 | B1 | 10/2003 | Shen et al. | |
| 7,905,760 | B2 * | 3/2011 | Yoneda | B25J 9/1615 446/330 |
| 8,425,620 | B2 * | 4/2013 | Johnson | A61F 2/76 623/24 |
| 8,447,428 | B2 | 5/2013 | Maisonnier et al. | |
| 8,552,983 | B2 | 10/2013 | Chiu | |
| 8,742,814 | B2 * | 6/2014 | Binder | A63F 9/24 327/261 |
| 8,851,953 | B2 * | 10/2014 | Oschuetz | A63H 33/042 446/124 |
| 8,930,019 | B2 | 1/2015 | Allen et al. | |
| 9,320,980 | B2 * | 4/2016 | Schweikardt | A63H 33/04 |
| 9,472,112 | B2 * | 10/2016 | Schweikardt | A63H 33/04 |
| 9,526,979 | B2 * | 12/2016 | Scott | A63F 13/00 |
| 2006/0100739 | A1 * | 5/2006 | Raffle | B25J 9/08 700/245 |
| 2007/0150102 | A1 | 6/2007 | Park | |
| 2009/0157221 | A1 | 6/2009 | Sip | |
| 2011/0021109 | A1 | 1/2011 | Le et al. | |
| 2012/0130541 | A1 | 5/2012 | Szalek | |
| 2013/0268119 | A1 | 10/2013 | Weinberg et al. | |

OTHER PUBLICATIONS

EP15181298, European Search Report, Mar. 20, 2017, European Patent Office.

* cited by examiner

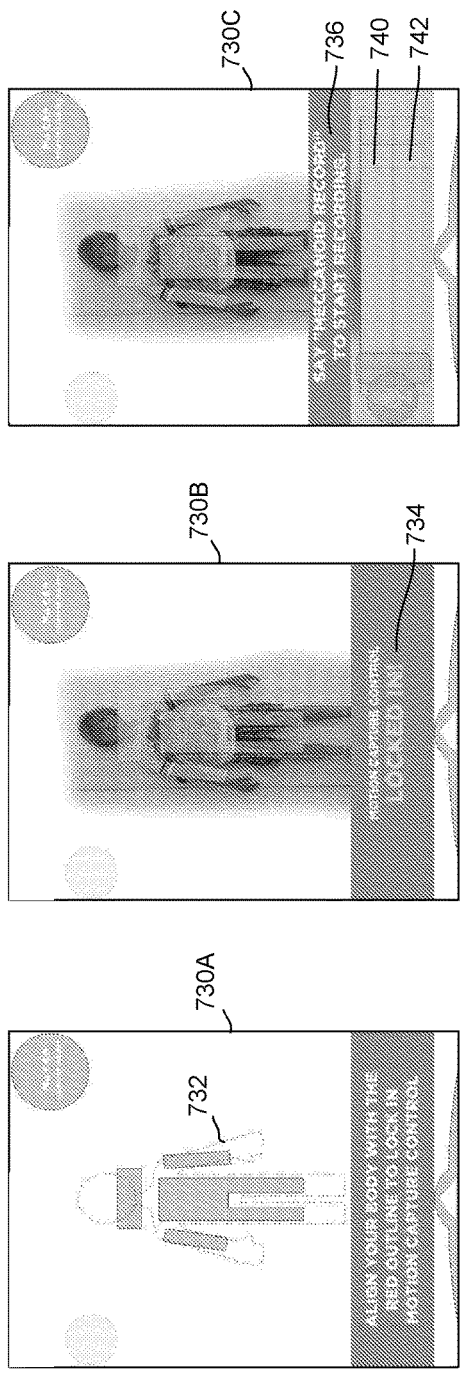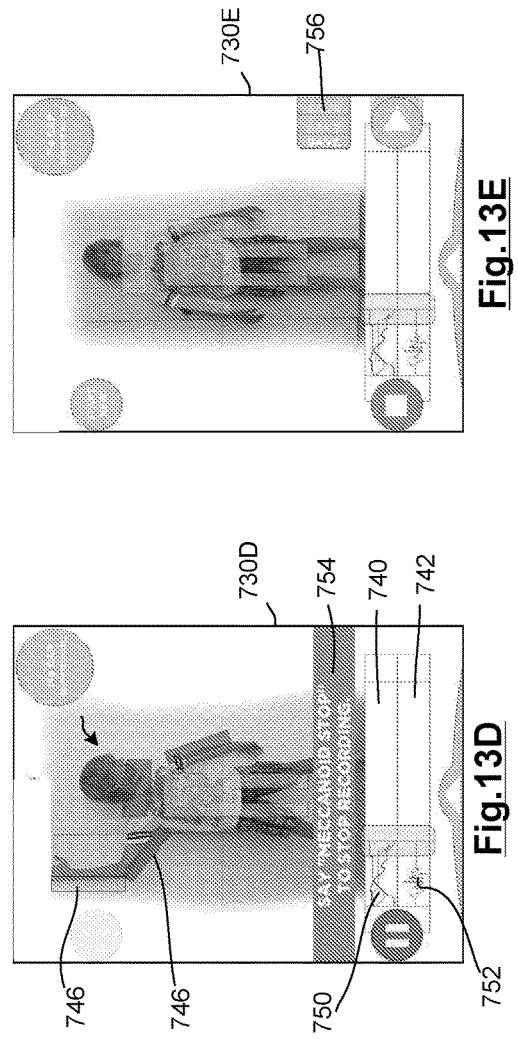

RECONFIGURABLE ROBOTIC SYSTEM

CROSS-REFERENCE TO RELATED APPLICATIONS

This application is a divisional of U.S. patent application Ser. No. 14/802,971 filed Jul. 17, 2015 which claims the benefit of, and priority to, U.S. Provisional Patent Application No. 62/086,179 filed Dec. 1, 2014, the contents of all of which are incorporated herein in their entirety.

FIELD

This disclosure relates generally to the art of toys and/or amusement devices, and more particularly to mechatronic systems for toy and/or educational markets.

BACKGROUND

Robotic figures for the toy and/or educational markets are known. Most robotic figures, however, cannot be reconfigured by the user.

There are a number of technical challenges in providing a reconfigurable robotic system or kit. First, such a system requires a means to identify its configuration and allow the user to control and/or program it. Second, there should be a way to enable users, particularly those with limited programming skills or experience, to easily program such a system.

SUMMARY

In one aspect, a reconfigurable robotic system is provided. The system includes a plurality of digital servo modules and a plurality of elemental building blocks. Each digital servo module includes a servomotor, including a servo position sensor, and the elemental building blocks are connectable with the digital servo modules to construct a robotic figure having position-controlled joints. Moreover, the elemental building blocks can be combined with the digital servo modules in a variety of permutations to construct robotic figures of varying configurations, which may be based on publicly available instructions for one or more predetermined builds or left entirely up to the imagination of the user.

A central controller communicates with and controls the digital servo modules. The central controller has at least one communication channel including an output port providing power, ground and a data signal. Each digital servo module includes an input port and an output port. The digital servo module input port has power, ground and data signal pins. The digital servo module output port has power, ground and data signal pins. The digital servo module input data signal pin is electrically discrete from the digital servo module output data signal pin. The input port of one of the digital servo modules is connected to the output port of the central controller, and the remaining digital servo modules are interconnected in sequence such that the input port of one digital servo module is connected to the output port of another digital servo module. The central controller and the digital servo modules are programmed to execute a communication protocol in which the central controller discovers digital servo modules, and wherein the digital servo modules are configured to transmit data along the channel in a serial manner prior to discovery and configured to transmit data along the channel in a quasi-parallel manner after discovery.

In the serial configuration, a given digital servo module may receive and process a data packet transmitted by the central controller without necessarily sending the data packet downstream to the next adjacent digital servo module, if present. In the quasi-parallel configuration, a given digital servo module may place its data signal I/O ports in a follow through mode such that upon receiving a data stream corresponding to the data packet the given digital servo module substantially immediately sends the data stream downstream to the next adjacent connected digital servo module, if present.

The data packet may be subdivided into a plurality of ordered sub-channels, each sub-channel providing a data stream for a respectively positioned one of said digital servo modules in the channel. The data packet may include a module feedback identification and in response thereto only the identified digital servo module transmits a reply packet back to the central controller.

The central controller and digital servo modules may be programmed to implement a discovery process in which: (a) each digital servo module initially operates in the serial configuration; (b) the central controller transmits a discovery signal in each sub-channel of the data packet; (c) upon receipt of a data packet encapsulating at least one discovery signal therein a given digital servo module detects the sub-channel of lowest order that carries the discovery signal, sends a reply in response to the central controller discovery signal, enters into said quasi-parallel configuration, and begins processing commands presented on the detected sub-channel; and (d) upon receipt of a discovery reply, the central controller ceases to transmit the discovery signal in the lowest order sub-channel then-currently transmitting the discovery signal.

The discovery process may allow the digital servo-modules to be hot-swappable and/or may allow the robotic figure to be dynamically reconfigured.

The robotic system may also include a digital LED module which includes a light emitting diode. The digital LED module has an input port and can have an output port. The digital LED module input port has power, ground and data signal pins. The digital LED module output port can have power, ground and data signal pins. The digital LED module input data signal pin can be electrically discrete from the digital LED module output data signal pin.

The digital LED modules may be connectable in sequence with the digital servo modules. The central controller, the digital servo modules and the digital LED modules may be programmed to implement the communication protocol in which the digital servo modules and the digital LED modules are configured in a serial manner prior to discovery and configured in a quasi-parallel manner post discovery.

The digital servo modules may be connectable to a standard servo unit via the digital servo module output port. In this case, the digital servo module may be configured to output a conventional servo signal on the output port signal line to control a connected standard servo unit.

Each digital servo module can include an LED, and each digital servo module may autonomously set the color of its LED in accordance with a predetermined internal status scheme.

The robotic system can also include analog or digital wheel modules controlled by the central controller for moving the robotic figure.

In some implementations the robotic system enables a user to direct the action (e.g., movement, audio and/or light patterns) of a robotic figure constructed according to a predetermined build by issuing voice commands or through a virtual remote app which enables a user to manipulate a virtual representation of the predetermined build. Thus, for example, a voice command such as 'raise arm', or raising an arm of the virtual representation, results in the corresponding rise of the physical arm. In some implementations the voice command recognition software and/or virtual remote app can be executed by an applications processor such as a smart phone or tablet operatively connected to the central controller through a wired or wireless link. In other implementations such functionality can be embedded in the central controller.

In some implementations the robotic system can enable someone of limited programming skill or experience to easily program a robotic figure to play an animation sequence in a variety of ways. These include a learned motion mode, a user motion capture mode, and an animation builder mode.

In the learned motion mode the user can manually manipulate the position-controlled joints of the robotic figure. In the process each digital servo module periodically transmits its servo position to the central controller, which records a trajectory (temporal sequence of servo positions) for each digital servo module. The central controller can thereafter transmit position commands to the digital servo modules so as to replay the recorded trajectories of the digital servo modules, respectively. This mode is particularly advantageous because it can be used to program a wide variety of robotic figure configurations constructed from different digital servo module and elemental building block arrangements.

The central controller may include a microphone and a speaker and the central controller can record audio in the learned motion mode. The recorded audio can be replayed in coordination with the replayed digital servo trajectories. In addition, the system may also record trajectories (or patterns) of LEDs employed in the digital servo module and/or in the digital LED modules.

In the motion capture mode an application processor such as a smart phone or tablet may execute an app which records a person's arm movements via an attached camera and processes the captured video images to obtain arm motion trajectory. This trajectory is then converted into servo position commands so that the actions of a robotic figure constructed according to a predetermined build mimics that seen in the captured video. The trajectory may be played by the robotic figure in substantially real time as the person's arm movements are being captured, or stored for later replay.

In the animation builder mode an application processor such as a smart phone or tablet may execute an app which enables a user to generate an animation sequence for a robotic figure constructed according to a predetermined build by manipulating a virtual representation of the predetermined build. The animation builder app processes the virtual actions (which may include servo movements, motor movements, light patterns and audio) to generate robotic system commands that mimic the virtual actions of the predetermined build and store such commands in an animation file for subsequent execution.

In some implementations the animation builder app includes a virtual builder function which enables a user to create a virtual representation of a reconfigured robot. The animation builder can thereafter be utilized to generate an animation sequence for the reconfigured robotic figure.

In another aspect a reconfigurable robotic system is provided which includes at least two digital servo modules, wherein each digital servo module includes a position-controlled motor and a position sensor for sensing a servo position; a plurality of elemental building blocks, the elemental building blocks being connected to the digital servo modules to construct a robotic figure having position-controlled joints, wherein the elemental building blocks are combinable with the digital servo modules to construct robotic figures of varying configurations. A central controller communicates with the digital servo modules via a plurality of communication channels, each of which is subdivided into a plurality of sub-channels. The central controller communicates with each given digital servo module via a respective sub-channel. The system utilizes a discovery process in which central controller periodically transmits a discovery signal in each sub-channel until a newly attached digital servo module transmits a reply to the discovery signal, at which time the central controller recognizes the presence of the newly attached digital servo module. The central controller transmits servo position commands to the recognized digital servo modules via the logical sub-channels and receives servo position feedback from the recognized digital servo modules. The central controller is configured to set the digital servo modules in a learned motion mode, in which the position-controlled joints can be manually manipulated and in the process each of the selected digital servo modules periodically transmits servomotor position to the central controller which records a trajectory for each digital servo module. The central controller can thereafter transmit position commands to the digital servo modules in order to replay the recorded servo trajectories.

In some implementations the central controller includes a microphone and a speaker. The central controller can record audio in the learned motion mode and replay the recorded audio in coordination with the replayed servo trajectories.

In some implementations each digital servo module includes an LED and each digital servo module autonomously sets the color of the LED in accordance with a predetermined internal status scheme. The LED colors may indicate the following internal status: (i) non-attached mode; (ii); normal mode; and (ii) learned motion mode.

In another aspect, a robotic system is provided which includes at least two digital servo modules, wherein each digital servo module includes a position-controlled motor and a position sensor for sensing a servo position; a plurality of building block elements, wherein the building block elements are connectable with the digital servo modules to create position-controlled joints of a robotic figure; at least two wheel modules enabling wheeled movement of the robotic figure; and a central controller communicating with and controlling the digital servo modules and the wheel modules. The central controller operatively places a selected group of digital servo modules in a learned motion mode, wherein a corresponding group of position-controlled joints is enabled to be manually manipulated, and wherein each of the selected digital servo module periodically transmits servomotor position to the central controller. The central controller is programmed to steer the robotic figure wheel modules based on the servo positions of the selected digital servo modules.

The robotic figure may include a limb, and the selected digital servo modules may provide position-controlled joints for the limb. The limb may be grasped by a user and the central controller may steer the wheel modules so that the robotic figure follows the user.

In another aspect, a reconfigurable robotic system is provided which includes at least two digital servo modules, wherein each digital servo module includes a position-controlled motor and a position sensor for sensing a servo position. A plurality of elemental building blocks are provided, the elemental building blocks being connected to the digital servo modules to construct a robotic figure having position-controlled joints. The elemental building blocks are combinable with the digital servo modules to construct robotic figures of varying configurations. A central controller communicates with the digital servo modules via a plurality of communication channels, each of which is subdivided into a plurality of sub-channels. The central controller communicates with each given digital servo module via a respective sub-channel. The central controller periodically transmits a discovery signal in each sub-channel until a newly attached digital servo module transmits a reply to the discovery signal, at which time the central controller recognizes the presence of the newly attached digital servo module. The central controller transmits servo position commands to the digital servo modules via the logical sub-channels and receives servo position feedback from the digital servo modules. A control application executes on at least one of the central controller or an applications processor communicating with the central controller. The control application enables a user to control the digital servo modules by controlling a virtual representation of a constructed robotic figure. The control application also enables the user to design a virtual representation of the constructed robotic figure, and executes a process in which the control application identifies each digital servo module and correlates the identified digital servo module with a location in the user-designed virtual representation.

BRIEF DESCRIPTION OF THE DRAWINGS

The foregoing and other aspects of the invention will be more readily appreciated having reference to the drawings, wherein:

FIGS. 13A-13E are screen shots associated with a motion capture application in which a robotic figure according to a predetermined build can be programmed by capturing a user's body motion.

DETAILED DESCRIPTION 1.0 Introduction

A robotic system is described which includes universal electronic modules that can be used to interconnect and/or animate skeletal structures. The system may be provisioned in the form of a kit that includes components such as various universal electronic modules as well as elemental building blocks and fasteners that can be used to construct the skeletal structures. The various electronic modules can be assembled together with the elemental building blocks to construct a controllable, animated, articulating skeletal arrangement such as a robot.

Figure 1:
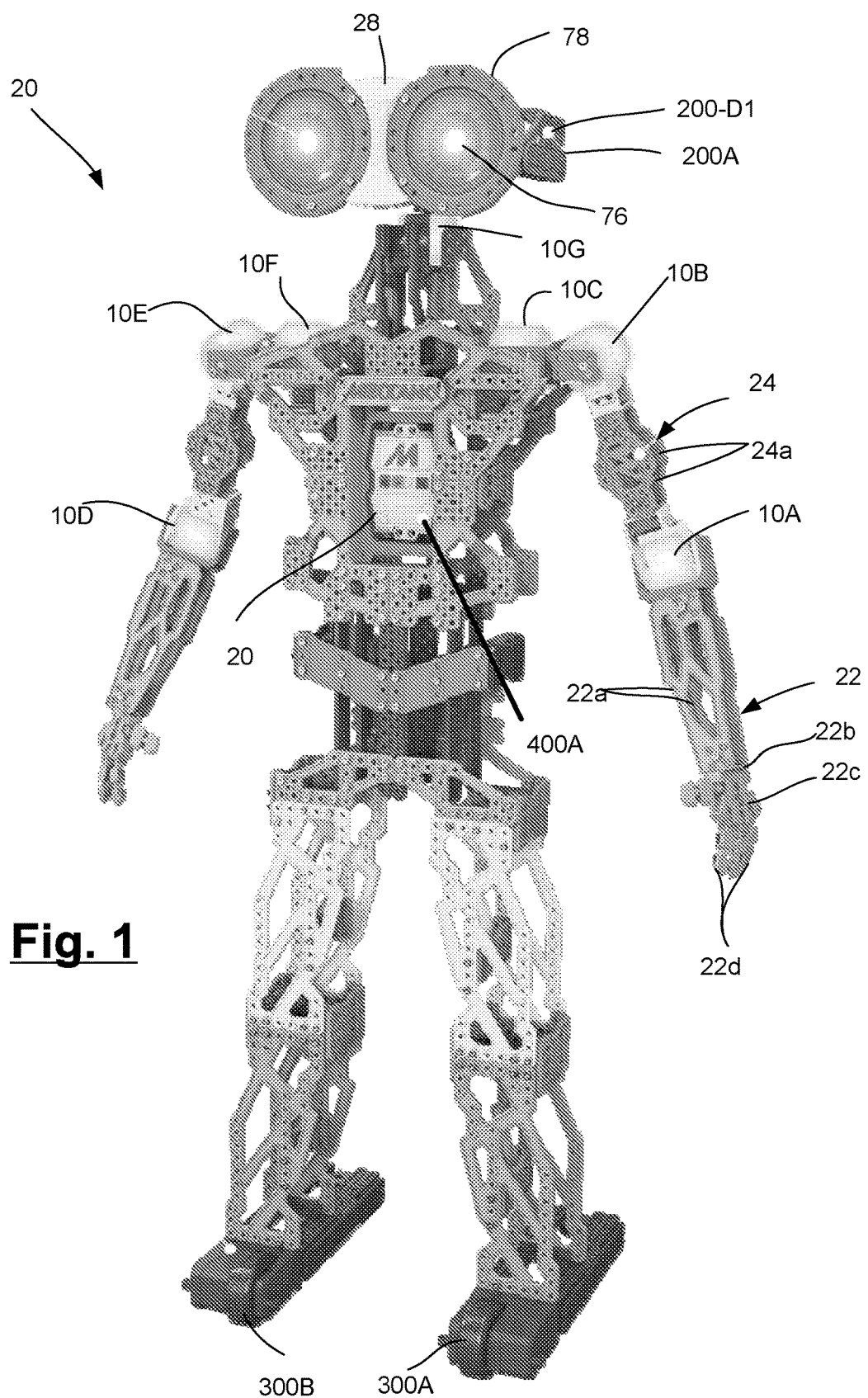
FIG. 1 is an illustration of a humanoid-like robot, constructed from a kit that includes elemental building blocks and universal electronic modules associated with a robotic system.

For example, FIG. 1 shows a humanoid-like robot 20 constructed from a first kit. The robot 20 includes many skeletal structures such as a forearm 22, which is assembled from elemental building blocks 22a, 22b, 22c, 22d, and an upper arm 24, which assembled from elemental building blocks 24a. The forearm 22 is articularly connected to the upper arm 24 by a digital servo module 100 (not directly visible in FIG. 1) which, as discussed in greater detail below, in assembly with various elemental building blocks, provides a pivot actuator 10 (instantiations of which are referenced as 10A-10G), that functions as a controllable joint between the forearm 22 and upper arm 24.

Figure 2:
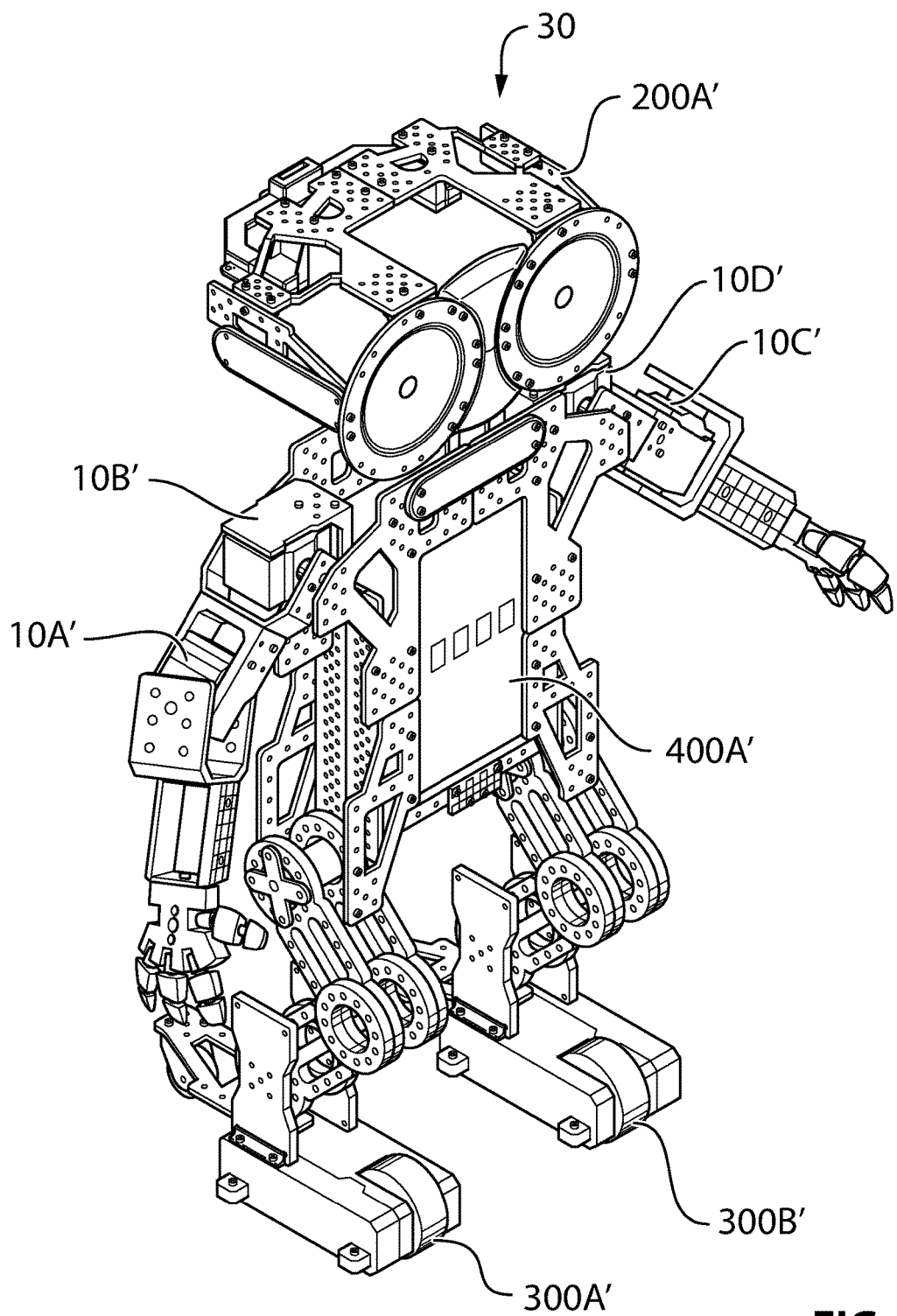
FIG. 2 is an illustration of another, smaller, humanoid-like robot constructed from a kit similar to but smaller than the kit used to construct the robot shown in FIG. 1.

FIG. 2 shows another humanoid-like robot 30 constructed from a second kit. The second kit is similar to but smaller than the first kit, having fewer components.

In the implementations shown in FIGS. 1 and 2 the skeletal structures are assembled from an elemental building block set styled on or similar to the well known Meccano™ building block sets, and the robotic system and/or kit(s) described herein may be referred to as the Meccanoid™ system and/or kit, but other forms of building blocks can be utilized to assemble skeletal structures. Alternatively, the skeletal structures may be unitarily provided as integral units, i.e., without the need to assemble them from smaller building blocks.

Figure 3:
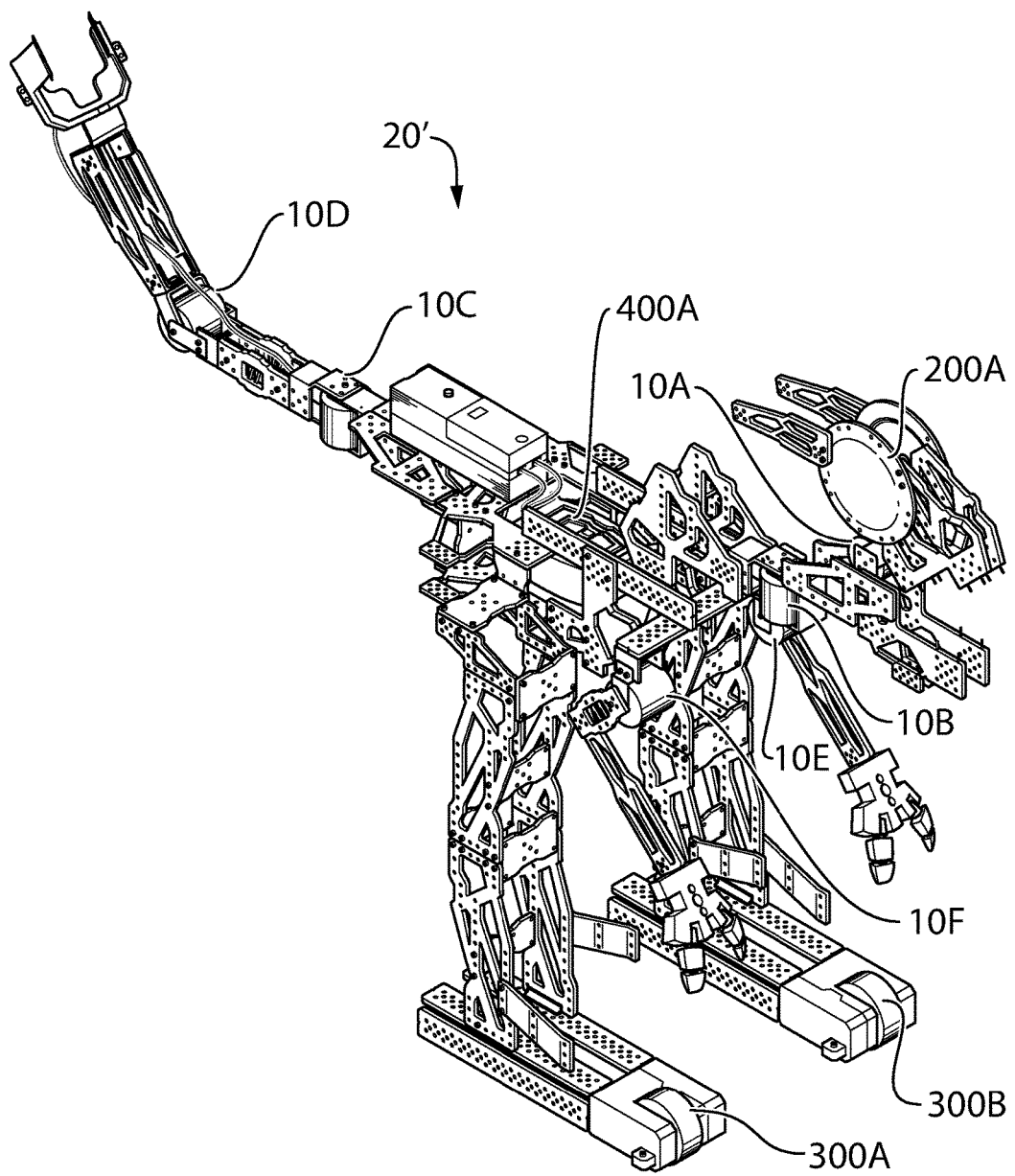
FIG. 3 is an illustration of a dinosaur-resembling robot, this robot being a reconfiguration of the kit used to construct the robot shown in FIG. 1.

As will be discussed in greater detail below, the robotic system is preferably reconfigurable such that a kit and/or elements of similar kits can be used to assemble various configurations of controllable articulating skeletal structures. For example, a robotic figure 40 shown in FIG. 3 is assembled from the components of the same kit used to construct the humanoid-like robot shown in FIG. 1.

To enable reconfiguration, the robotic system comprises a collection of 'plug and play' electronic modules that can be dynamically interconnected to provide a variety of animation effects. The electronic modules include:
- a digital (or analog) servo module 100, which is used to control joint position
- a digital (or analog) LED module 200, which is used to control one or more light emitting diodes (LEDs)
- an analog (or digital) wheel module 300, which is used to mobilize robotic figures
- a central controller 400, which communicates with and directs the foregoing modules The central controller 400 is necessary in order to construct any system-based robotic figure. As discussed in greater detail below, the robotic system preferably employs a digital communications protocol including a digital command set, which may be referred to herein as Meccanoid™ commands, for communicating control instructions between the central controller 400 and at least one digital module. The digital command set includes specific command codes that are interpreted by the digital modules. Any module that is capable of interpreting the digital command set is referred to herein as a digital module, e.g., digital servo module or digital LED module. For example, for setting the position of a joint, the command set can include a digital command code such as "XY" (X being the position command, Y being the argument), as opposed to a conventional analog pulse coded modulation control signal. The digital servo module 100 interprets and executes such a command to control the position of its corresponding servo. Likewise, for setting the color of an LED the command set can include a digital command code such as "JK" (J being the set colour command, K being the colour argument). The digital LED module 200 interprets and executes such a command to control its associated LED(s). As discussed in greater detail below, the robotic system can preferably also control a limited number of modules that use conventional analog control signals. Such modules will be referred to herein as analog modules. For example, an analog wheel module can includes a dc motor that is directly controlled by the central controller 100 via dc power lines.

As described in greater detail below, the central controller 400 can also be connected to an applications processor for directing the central controller.

From the foregoing it should be appreciated that a robotic figure can be assembled using various configurations of digital and/or analog servo modules, digital and/or analog LED modules, and digital and/or analog wheel modules, all directed by the central controller 400. For example, the humanoid-like robot 20 illustrated in FIG. 1 includes one central controller 400A which drives eight digital servo modules 100A, 100B, . . . 100H (hidden from view) that are employed in eight pivot actuators 10A, 10B, . . . 10H (10H being located in the head area and hidden from view); one digital LED module 200A; and two analog wheel modules 300A, 300B. The humanoid-like robot illustrated in FIG. 2 includes one central controller 400A' which drives four digital servo modules 100A', 100B', . . . 100D' (hidden from view) that are employed in four pivot actuators 10A', 10B', . . . 10D'; one digital LED module 200A'; and two analog wheel modules 300A' and 300B'. The robot 20' illustrated in FIG. 3, which as indicated earlier is constructed from the kit used to construct the robot 20 shown in FIG. 1, includes one central controller 400A which drives six digital servo modules 100A, 100B, . . . 100F (hidden from view) that are employed in eight pivot actuators 10A, 10B, . . . 10F; one digital LED module 200A; and two analog wheel modules 300A, 300B.

The description will now turn to discussing each of the foregoing modules in greater detail and the manner in which they interact to achieve engaging play for children and others of limited programming experience or capability.

2.0 Electronic Modules 2.1 Digital Servo Module

Figure 4:
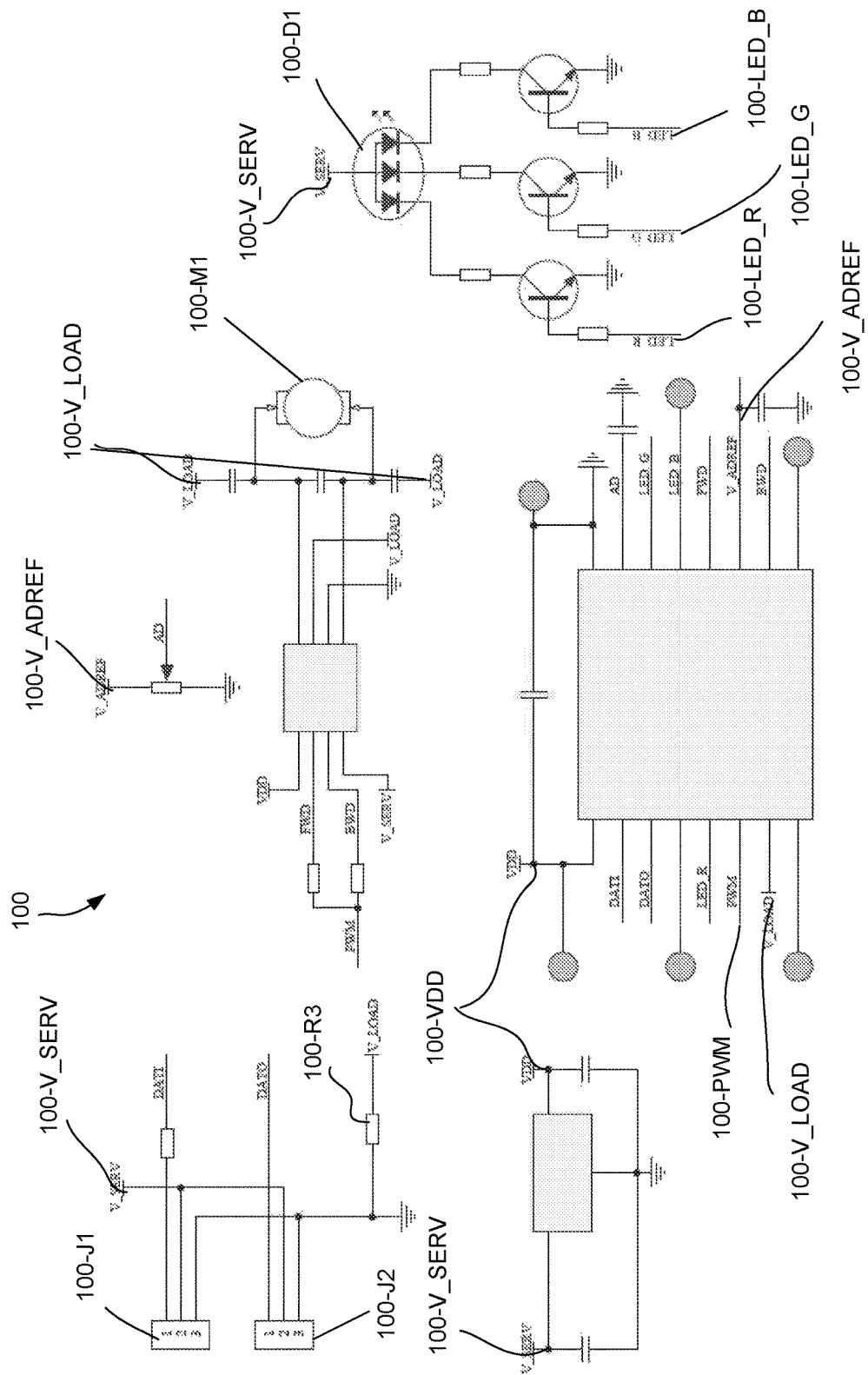
FIG. 4 is a hardware circuit diagram of a digital servo module employed in the robotic system.
Figure 5A:
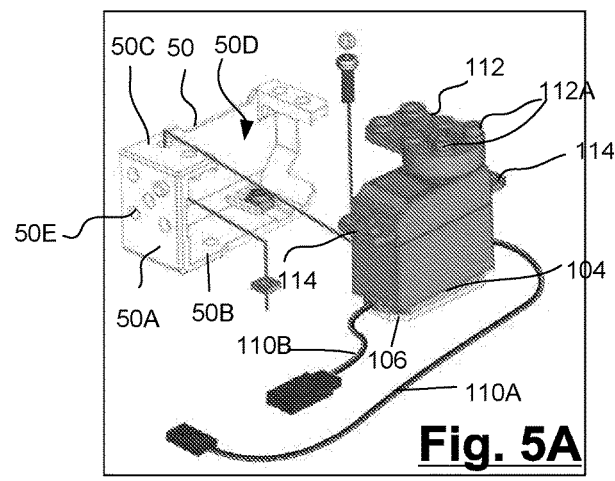
FIGS. 5A-5D are instructional assembly views of a pivot actuator constructed from a digital servo module.

FIG. 4 is a hardware circuit diagram of the digital servo module 100, which includes a driving dc motor 100-M1. As seen best in FIG. 5A, the motor 100-M1 includes a housing 102 and a printed circuit board (PCB) 104 which is contained in a covering 106 connected to the motor housing 102. The digital servo module 100 has two 3-wire connecting cables 110 connected to the PCB 104 for electrical input and output connections, (the input cable being designated 110A, and the output cable being designated 110B), as discussed in greater detail below. The digital servo module 100 includes a rotational output arm 112 which has a limited angular range. By controlling the position of the servo, the angular position and motion of the associated joint can be controlled Returning to FIG. 4, the digital servo module 100 includes a microcontroller 100-U3 which is preferably programmed for communicating with the central controller 400 and other system modules, executing commands provided by the central controller 400 in accordance with the digital communications protocol and providing synchronized or unsynchronized feedback to the central controller 400.

The motor 100-M1 is connected to an H-bridge circuit 100-U1. The H-bridge circuit 100-U1 is controlled by the microcontroller 100-U3, which provides a pulse width modulated signal, 100-PWM, that switches the supply of current provided by the H-bridge circuit 100-U1 to the motor 100-M1 in order to control the position, speed and/or torque of the motor 100-M1, as known in the art per se.

The digital servo module 100 includes at least two feedback sensors, a potentiometer 100-VR1 and a current sensor 100-R3.

The potentiometer 100-VR1 has a moving element that is physically connected to the output arm 112 such that the voltage generated at a potentiometer output 100-V_ADREF represents the angle of the joint. The potentiometer output 100-V_ADREF is connected to the microcontroller 100-U3 (pin 11), which converts the sensed voltage to a digital joint angle.

The current sensor 100-R3 is a low resistance resistor which has one end connected to the motor 100-M1 and the microcontroller 100-U3 at point 100-V_LOAD. The other end of the resistor 100-R3 is connected to ground. The microcontroller 100-U3 is thus configured to read the average current flowing through the motor 100-M1 and generate useful data such as torque (which will be proportional to current) or a stall condition (which occurs when the current spikes beyond a predetermined threshold level).

The digital servo module 100 also includes an LED, 100-D1, which is connected to and controlled by the microcontroller 100-U3 via lines 100-LED_R, 100-LED_G, and 100-LED_B. The microcontroller 100-U3 can control the color of the LED 100-D1, which can be used to visually indicate a control status of the digital servo module, as discussed in greater detail below, or otherwise used to animate the robotic figure.

The digital servo module includes two I/O communication ports 100-J1 and 100-J2, which function as input and out ports, respectively. Each I/O port 100-J1 or 100-J2 has three pins for connection to three-wire connecting cable 110A or 110B, which, as seen best in FIG. 8, comprises a power line 60P, ground line 60G and data signal line 60D. Pin #3 of each port 100-J1 and 100-J2 is intended for connection to the ground lines 110K of the connecting cables 110A, 110B, and pin #3 of 100-J1 and pin#3 of 100-J2 are connected to a common ground point in the digital servo module. Likewise, pin #2 of each port 100-J1 and 100-J2 is intended for connection to the power lines 60P of the connecting cables 110A, 110B, and pin #2 of 100-J1 and pin#2 of 100-J2 are connected to point 100-V_SERV in the digital servo module 100. Point 100-V_SERV is connected to the input of a voltage regulator 100-U2, which provides a conditioned power signal 100-VDD used to power the H-bridge circuit 100-U1 and the microcontroller 100-U3. Pin #1 of port 100-J1 is intended for connection to the data signal line 60D of input connecting cable 110A and pin #1 of port 100-J2 is intended for connection to the data signal line 60D of output connecting cable 110B. Note, however, that pin #1 of port 100-J1 and pin #1 of 100-J2 are not tied together such that the data signal lines of the input and output communication cables 110A, 110B are electrically discrete.

FIGS. 5A-5D are instructional build views which illustrate one implementation of how the digital servo module 100 can be assembled with elemental building blocks to construct the pivot actuator 10.

Figure 5C:
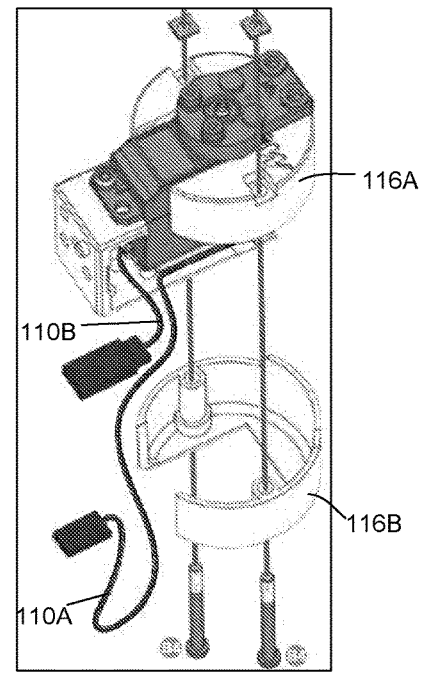
Figure 5B:
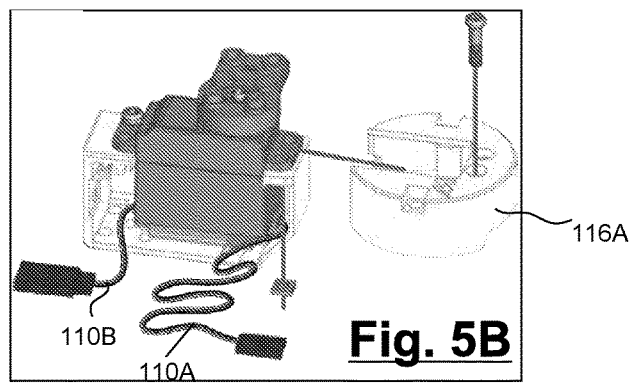
Figure 5D:
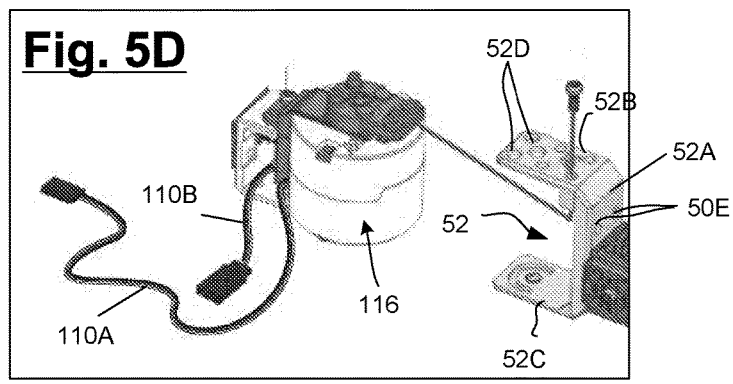

The elemental building blocks include first and second brackets 50, 52 (FIGS. 5A, 5D) which can pivot or rotate relative to one another so as to provide a pivot joint. The first bracket 50 includes a rear wall 50A and sidewalls 50B, 50C that define an opening 50D for seating the motor housing 102. The motor housing 102 has two outwardly extending flanges 114 for mounting the housing 102 on the first bracket sidewall 50C via one or more fasteners (such as a bolt and nut). As seen in FIGS. 5B and 5C, a semi-circular casing 116 comprising upper and lower halves 116A, 116B is mounted about and onto one of the motor housing flanges 114 and the first bracket sidewall 50C. As seen in FIG. 5D the second bracket 52 has a rear wall 52A and two sidewalls 52B, 52C. Sidewall 52B includes integrally formed interconnect features such as holes 52D for connection to mating second interconnect features such as projections 112A integrally formed in the servo output arm 112. The second bracket 52, being U-shaped in form, is preferably manufactured from a flexibly resilient material such as plastic which enables its sidewalls 52B, 52C to flex somewhat to allow the second bracket 52 to snap fit over the output arm 112 and first bracket 50. One or more fasteners may also be used to secure the second bracket 52 to the servo output arm 112 and/or first bracket 50.

The rear wall 50A of the first bracket 50 and the rear wall 52A of the second bracket 50 may include holes 50E, 52E, respectively, for interconnecting the pivot actuator 10 to other building blocks using the kit fasteners.

2.2 Analog Servo Module

The analog servo module (not shown) is a conventional pulse-proportional servo which includes at least a three-pin input connector for a three-wire connection cable comprising power, ground and data signal lines. The conventional standard servo data signal is a positive pulse ranging from about 0.5 millisecond to about 2.5 millisecond (and more typically in the range of about 0.9 to 2.1 ms) repeated at a frequency of about 50 Hz. The conventional servo unit positions its output shaft in proportion to the width of the pulse. Physically, the analog servo module may be similar if not identical to the digital servo unit and used in the same or similar manner to assemble pivot actuator 10.

The analog servo module is directly driven by either the central controller 400 or a digital servo module 100. As discussed in greater detail below the digital modules can be daisy chained together but analog modules cannot be serially connected to one another thus limiting the number of analog modules that can be included in the robotic system.

2.3 Digital LED Module

Figure 6:
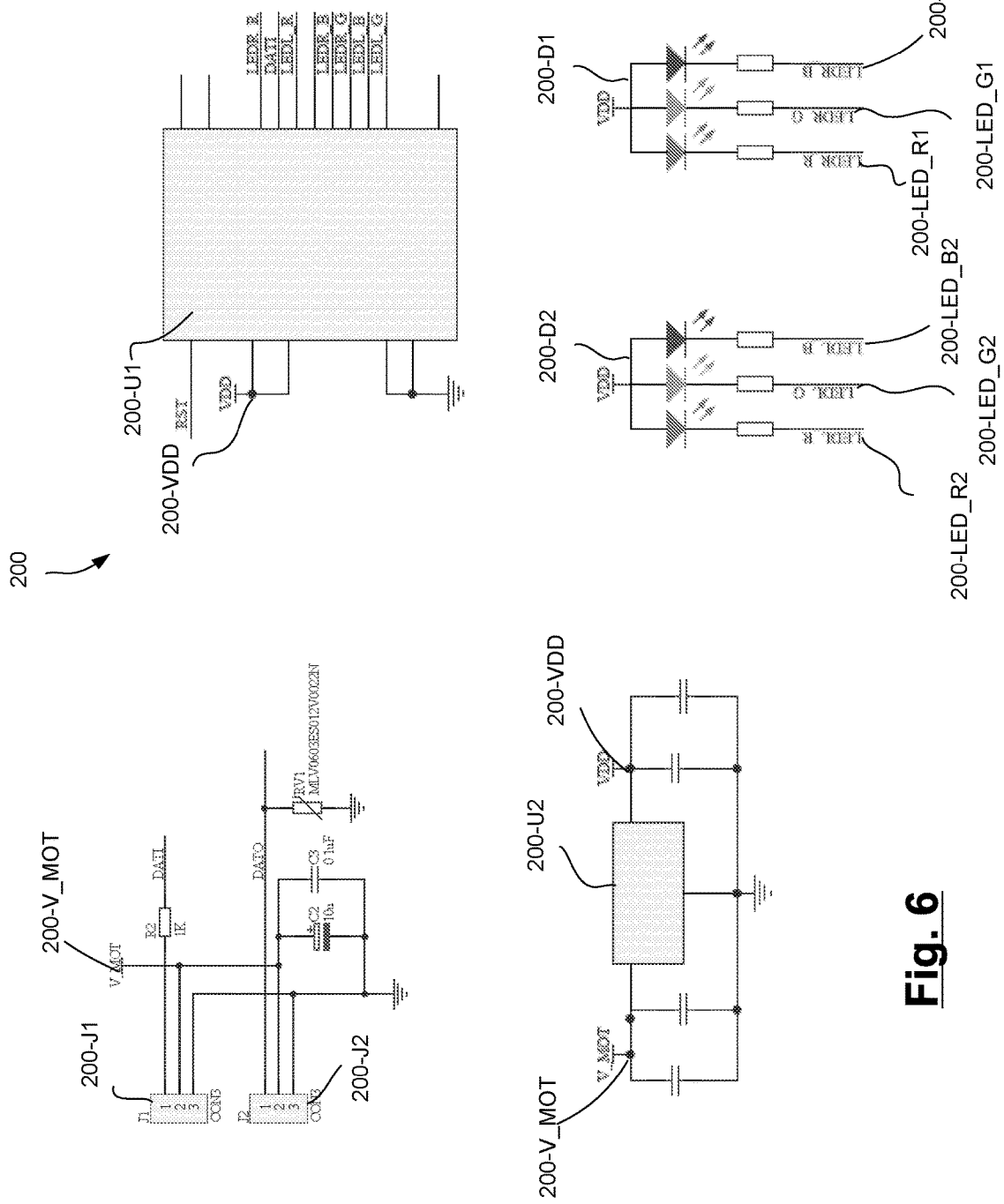
FIG. 6 is a hardware circuit diagram of a digital LED module employed in the robotic system.

FIG. 6 is a hardware circuit diagram of the digital LED module 200. The digital LED module 200 has a control configuration similar to the digital servo module 100, excepting the servomotor and its drive circuitry. More particularly, the digital LED module 100 includes at least one color LED 200-D1, preferably a second color LED 200-D2, a microcontroller 200-U1, preferably two I/O communication ports 200-J1 and 200-J2 which respectively provide input and output ports for connection to input and output three-wire cables 110A, 110B, respectively, and a voltage regulator 200-U2.

The microcontroller 200-U1 is likewise preferably programmed for communicating with the central controller 400 and other system modules, executing commands provided by the central controller 400 in accordance with the digital communications protocol and providing synchronized or unsynchronized feedback to the central controller 400.

The microcontroller 200-U1 controls the turn on, turn off of the LEDs 200-D1, 200D2 as well as the colors thereof, which can be controlled by relative intensities of red, green and blue light via signals 200-LED_R1, 200-LED_G1, 200-LED_B1, and 200-LED_R2, 200-LED_G2 and 200-LED_B2.

The two I/O communication ports 200-J1 and 200-J2 are wired similarly to the I/O ports of the digital servo module 100 in that pin #1 of port 200-J1 is not connected to pin #1 of port 200-J2 so that the data signal lines 60D of the input and output communication cables 110A, 110B remain electrically discrete. Pin #2 of each port 200-J1 and 200-J2 is intended for connection to the power lines 60P of the connecting cables and are connected together at point 200-V_MOT. Point 200-V_MOT is connected to the input of a voltage regulator 200-U2, which provides a conditioned power signal 200-VDD that powers the microcontroller U1. Pin #3 of each port 200-J1 and 200-J2 is intended for connection to the ground lines 60G of the connecting cables 110A, 110B and are connected together to the common ground in the digital LED module 200.

In some embodiments the output port 200-J2 may be omitted. In such embodiments no other digital modules could be attached downstream of the digital LED module.

Figure 2A:
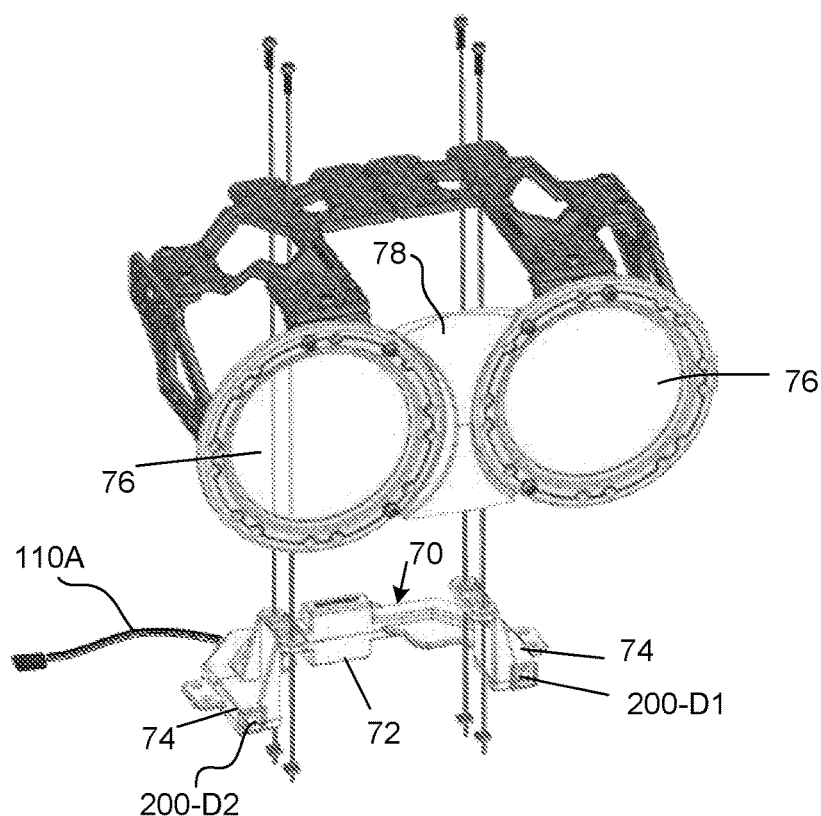
FIG. 2A is a partial exploded assembly view of a head portion of the robot shown in FIG. 2.

The digital LED module 200 can have more than one LED (which are connected in parallel) and be employed to animate anthropomorphic eyes. For instance, the partial exploded view of FIG. 2A shows the digital LED module 200 integrated in a casing 70. The digital LED module 200 has a PCB (not shown) which is contained in a container 72 of the casing 70. Input cable 110A is connected to the PCB. The casing 70 also includes two spaced apart wing portions 74 in which are mounted two LEDs 200-D1 and 200-D2.

The two LEDs 200-D1 and 200-D2 can be mounted so as to shine onto concave translucent surfaces 76 of bilocular eye structure 78.

2.4 Analog LED Module

The analog LED module (not shown) constitute one more LEDs that are directly controlled by setting voltages on certain output ports on the central controller 400.

2.5 Analog Wheel Module

Figure 2B:
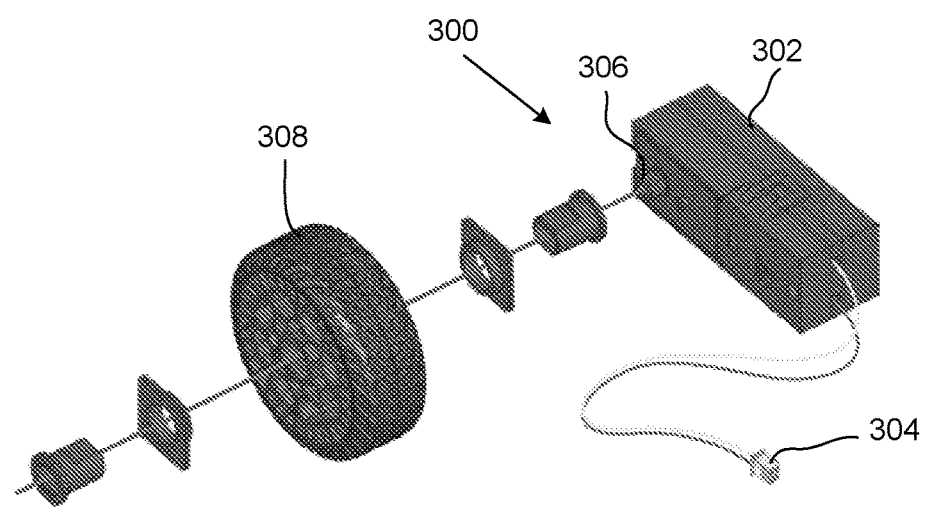
FIG. 2B is a partial exploded assembly view of a foot portion of the robot shown in FIG. 2

The analog wheel module 300 is shown in the partial exploded view of FIG. 2B and includes a rotating d.c. motor 302 that has a two wire input 304 for power and ground. The d.c. motor 302 has an output shaft 306 and the amount of current supplied to the motor controls the speed of the output shaft. As seen in FIG. 2B, a wheel 308 can be mounted to the output shaft 306. A robotic figure can employ two of the analog wheel modules 300 to drive two wheels, which can be controlled to move the robotic figure forward, backward and/or turn it by changing the speed of one wheel relative to the other.

2.6 Digital Wheel Module

Figure 7:
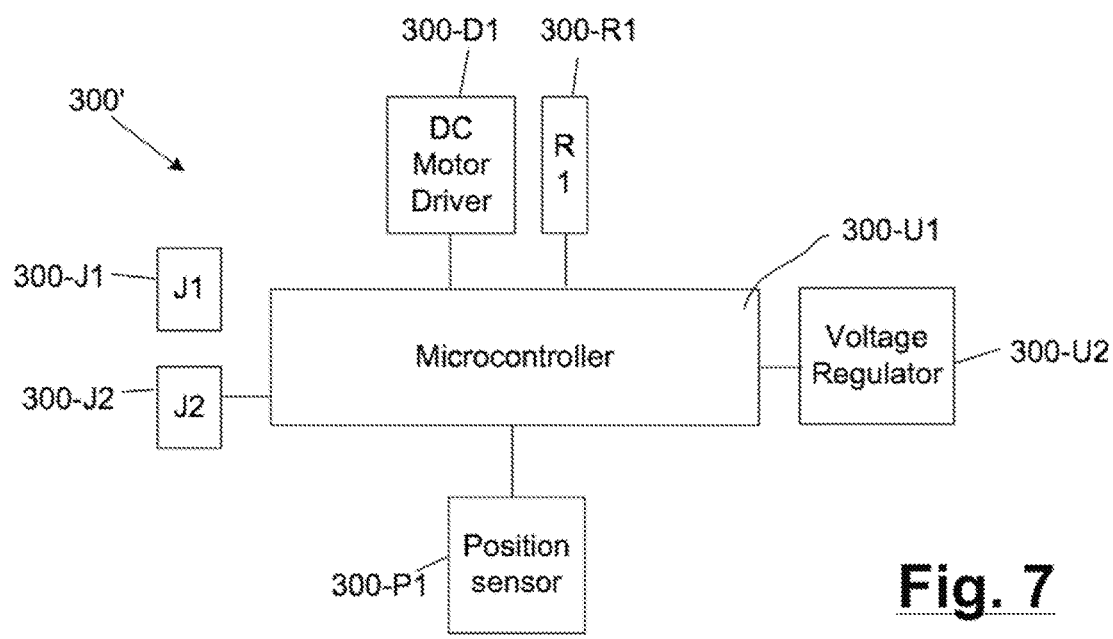
FIG. 7 is a hardware block diagram of a digital wheel module employed in the robotic system.

The system can also employ a digital wheel module 300' shown in schematic block diagram form in FIG. 7, which will include a microcontroller 300-U1, two I/O communication ports 300-J1 and 300-J2 which respectively provide input and output ports for connection to input and output three-wire cables 310A, 310B, respectively, a voltage regulator 300-U2, a motor driver circuit 300-D1 for driving a d.c. motor 302, a current detector 300-R1 associated with the driver circuit for current feedback purposes, and a position or speed sensor 300-P1, such as a Hall effect sensor or absolute encoder, to provide feedback as discussed in greater detail below.

Similar to previously described digital modules the microcontroller 300-U1 is preferably programmed for communicating with the central controller 400 and other system modules, executing commands provided by the central controller 400 in accordance with the digital communications protocol and providing synchronized or unsynchronized feedback to the central controller 400.

2.7 Central Controller

Figure 8:
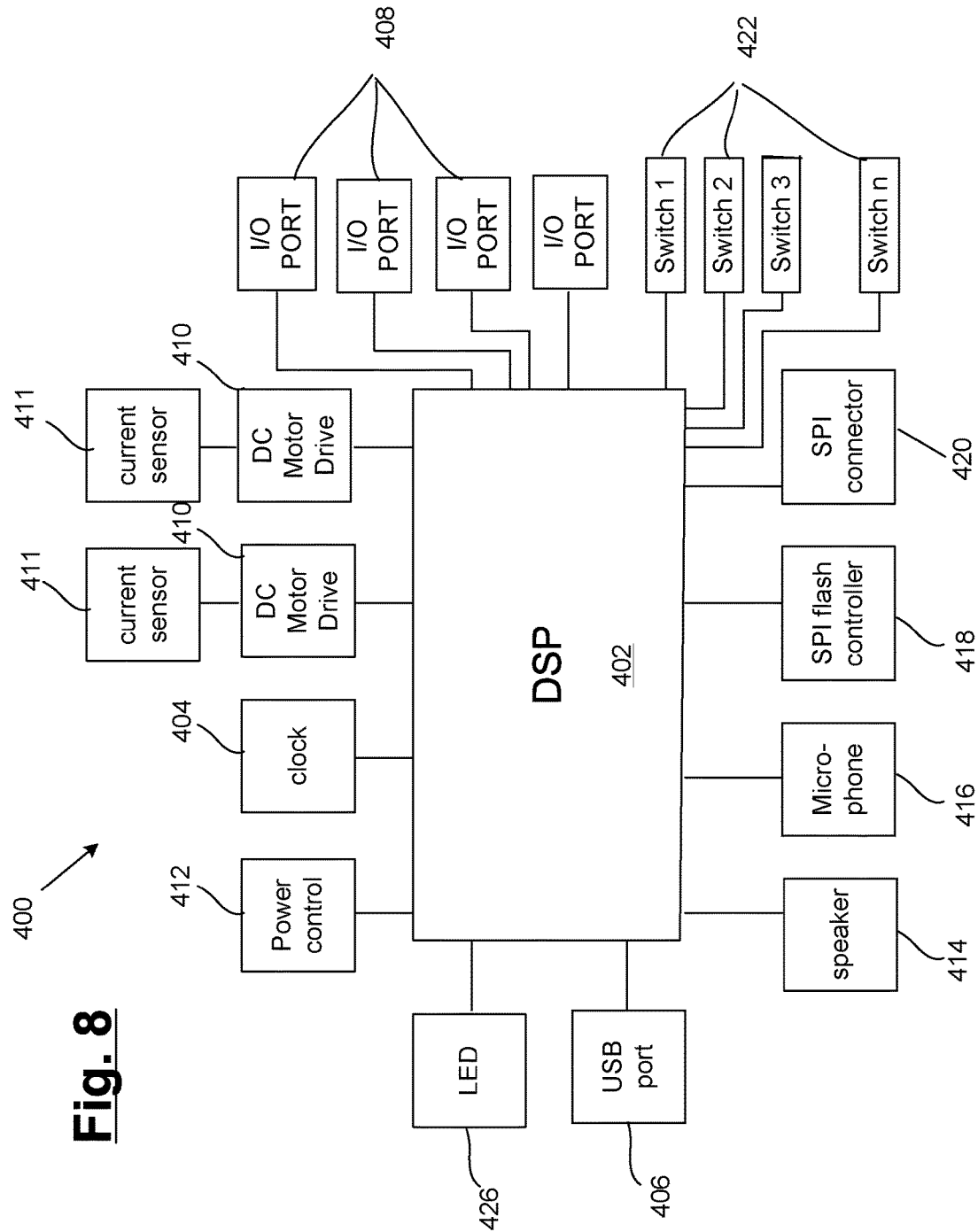
FIG. 8 is a hardware block diagram of a central controller employed in the robotic system.

FIG. 8 shows a schematic hardware block diagram of one implementation of the central controller 400.

The central controller 400 includes a digital signal processor (DSP) 402 which is operationally connected to:
- a real time clock 404
- a USB port 406
- a plurality of three-pin I/O ports 408
- two DC motor driver circuits 410 with associated current sensors 411
- a power controller 412
- an audio amplifier and speaker 414
- a microphone 416
- at least one SPI flash memory 418
- an SPI connector 420
- at least one manually actuated button or switch 422
- at least one light emitting diode (LED) 426

The motor driver circuits 410 are on-board drivers intended to drive small d.c. motors such as rotating d.c. motor 302 used to drive wheels 308. These circuits are useful where it is intended to deploy the analog wheel module 300 (as in FIGS. 1 and 2) to mobilize the robotic figure. In some implementations the motor driver circuits 410 and associated current sensors 411 can be omitted if it is intended to deploy the digital wheel module 300' which has the necessary circuitry for driving d.c. motor 302.

Each of the three-pin I/O ports 408 is connected to a different I/O channel of the DSP 402. As discussed previously, one pin is intended for connection to the power line 60P, one pin is intended for connection to the ground line 60G, and one pin is intended for connection to the data signal line 60D. As discussed previously, the data signal pins/lines are electrically discrete.

The power controller 412 interfaces the DSP 402 with a power source such as a rechargeable battery.

The USB port 406 enables the central controller 402 to communicate with computing devices such as computers, tablets or smart phones for application processing purposes.

3.0 Communication Protocol 3.1 Network Topology

Figure 9:
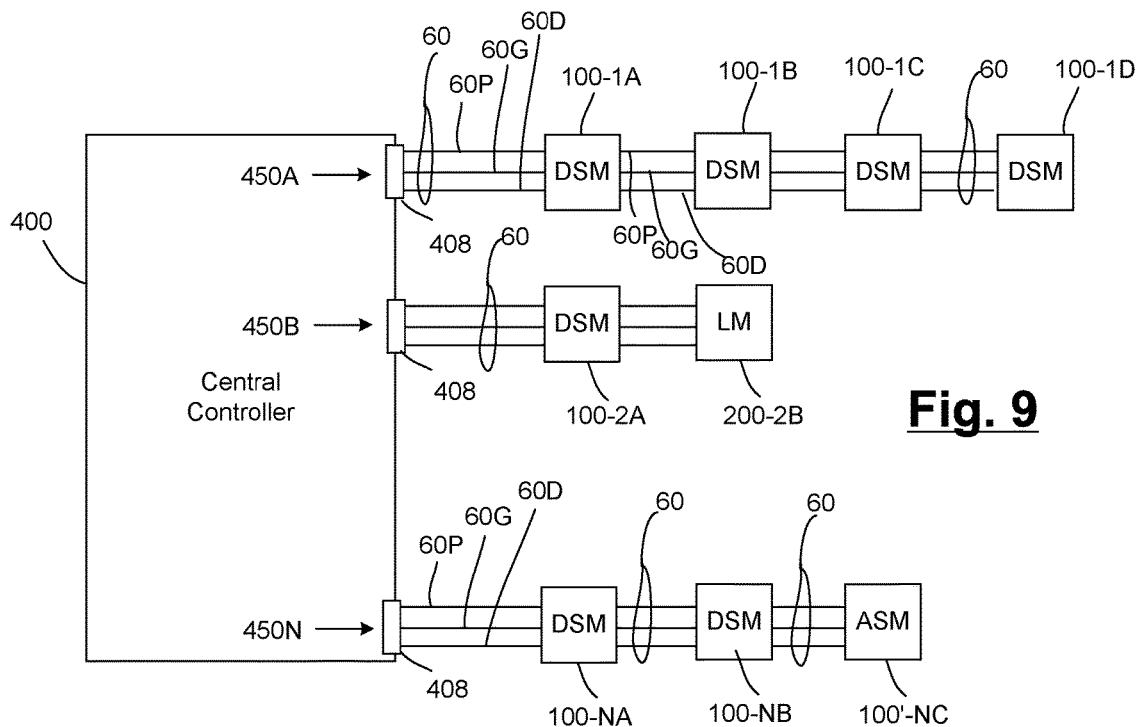
FIG. 9 is a network topology diagram showing a networking scheme for connecting the central controller to digital modules in the robotic system.

FIG. 9 illustrates the network topology of the robotic system. The central controller 400 has multiple channels 450 (individual channels being designated 450A, 450B, ..., 450N) provided by the I/O ports 408. To limit latency issues, the number of digital modules that can be serially chained in any given channel is limited to preferably no more than four modules. Each module is connected to its neighbor via a three wire three-wire link 60, such as provided by the three-wire output cable of one digital module (such as output cable 110B of the digital servo module 100) when connected to the three wire input cable of the adjacent downstream digital module (such as input cable 110A of the digital servo module 100). As discussed previously each link 60 comprises power, ground and data signal lines 60P, 60G and 60D, respectively. The power lines 60P of any adjacent links 60 are electrically interconnected and the ground lines 60G of any adjacent links 60 are serially interconnected. However, the data signal lines 60D of any adjacent links are not electrically interconnected; that is, prior to discovery any signal on a data signal line 60D of a given link 60 is not instantaneously propagated to the data signal line 60D of adjacent link(s) 60.

As will be discussed in greater detail below, each channel 450 initially operates in a serial mode for the purposes of discovering digital modules. In this mode a digital module will receive a data packet from the central controller 400, process the packet, and determine whether or not to transmit the packet on to the downstream digital module. However, once the digital module is discovered by the central controller 400, the channel behaves at that point in a quasi-parallel manner in that each discovered digital module places its data signal input and output pins (e.g., pin #1 of 100-J1 and pin #1 of 100-J2) in a follow-through mode so that all data is substantially presented at the same time to each digital module in the channel. This scheme is advantageous because the system is intended as a low cost device using low cost, low speed electronics. Further, the channel communication rate will typically also operate relatively slowly, e.g., at a maximum speed of only 2400 baud. With such a low communication speed there will be a lag as each digital module in the series accumulates the contents of a packet before transmitting it downstream, resulting in considerable latency at the distal digital modules. The transition to the quasi-parallel mode, however, reduces latency and improves control responsiveness.

The analog servo module (ASM) 100' does not incorporate the logic required to communicate via the digital communication protocol and thus can only be placed at the end of the channel immediately downstream to a digital servo module 100 (such as ASM 100'-NC) or immediately downstream to the central controller 400. The microcontroller 100-U3 of the digital servo module 100 and the DSP 402 of the central controller 400 are each programmed to control a connected analog servo module 100' by transmitting the conventional servo PCM signal over the data signal line 60D.

3.2 Link Protocol

Figure 10:
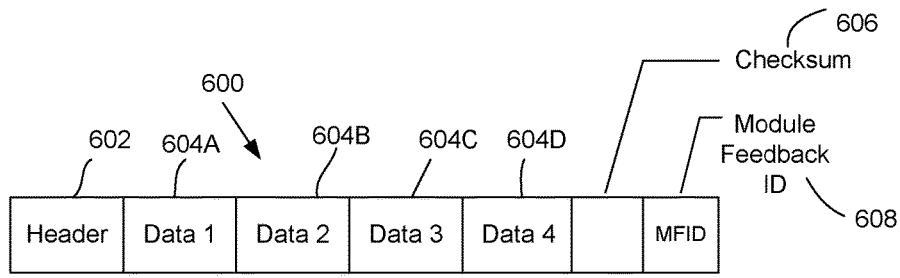
FIG. 10 is a diagram of the structure of a data packet transmitted by the central controller to the digital modules.

FIG. 10 shows the format of a data packet 600 from the central controller 400 to the digital modules. The packet 600 includes a header word 602, a plurality of sub-channel data words 604 (individually 604A-604N), and a word comprising a checksum nibble 606 and a module feedback ID (MFID) nibble 608. Each word is preferably formulated by a start bit, eight data bits, and a stop bit. The data packet 600 as shown is specifically configured for the situation where the maximum permissible number of modules is four. Those skilled in the art will understand that in other implementations the format of the data packet may vary from that illustrated. Other data pack structures are also possible.

Figure 11:
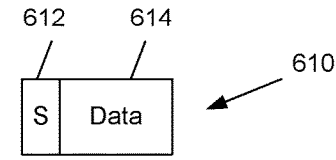
FIG. 11 is a diagram of the structure of a reply data packet transmitted by the digital modules to the central controller.
Figure 12:
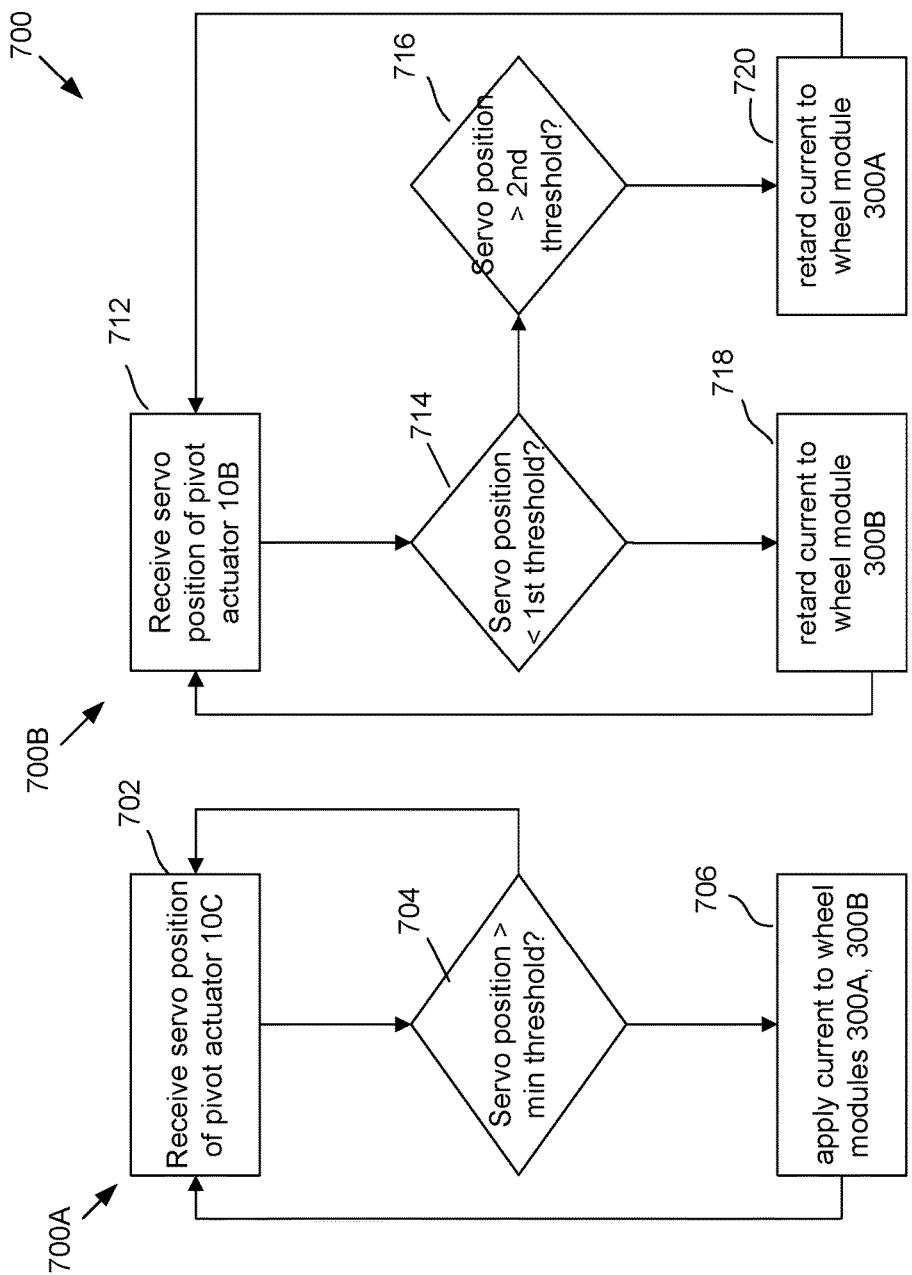
FIG. 12 is a flow diagram of an algorithm for enabling a robotic figure according to a predetermined build to follow a user when grasped by the user.

A reply data packet 610 from the digital modules to the central controller is preferably formatted as a single word comprising a start bit 612 and a response byte 614 as shown in FIG. 11. Other formats are also possible.

The central controller 400 periodically transmits data packets 600 on each channel 450, for example, at twenty Hz. Each sub-channel word 604 contains a command for the correspondingly positioned digital module in the channel 450. For example, in channel 450B of FIG. 9 the first sub-channel word 604A would contain a command for digital servo module (DSM) 100-2A and the second sub-channel word 604B would contains a command for digital LED module (LM) 200-2B. The MFID 608 specifies which of the digital modules in the channel 450 should issue the reply data packet 610. For example if the value of the MFID 608 is 0x00, digital servo module 100-2A would transmit a reply packet and if the value of the MFID 608 was 0x01, digital LED module 200-2B would transmit the reply packet. As the central controller 400 periodically transmits data packets 600 the value of the MFID 608 is continuously cycled so that each discovered digital module in the channel has an opportunity to reply in the interval between central controller transmissions. For example, with a maximum of four modules in a channel and a central controller transmission rate of 20 Hz, each digital module provides a feedback rate of 5 Hz.

3.3 Discovery

To implement rapid dynamic reconfiguration, the robotic system undergoes a preferred discovery process upon startup or power-up.

Each channel 450 can have up to N (preferably four) digital modules in positions A, B, . . . N in a serially connected configuration or serial chain. For example, in FIG. 9 channel 450A has four digital servo modules (DSM) 100-1A, 100-1B, 100-1C and 100-1D, in positions A through D respectively, and channel 450B has two digital modules, DSM 100-2A and LM 200-2B in positions A through B, respectively . . . . The digital module in position A is immediately adjacent to the central controller 400 and thus can be considered as the first, upstream, module. The digital module in position N is furthest downstream from the central controller 400 and thus can be considered as the last digital module in the serial chain. (In other implementations, the channel may support greater or fewer digital modules depending on the serial bit rate that can be safely supported.)

Upon power-up the central controller transmits an "Assign ID" command on all sub-channel data words 604.

When the first digital module A receives the data packet, the module notes that the first instance of the "Assign ID" command is in the first sub-channel word 604A. Consequently the first digital module A is able to detect that it is in the first position in the serial chain. The first digital module A does not pass this data packet downstream to the next adjacent digital module B in the serial chain. Instead the first digital module A sends an "Acknowledge ID" reply back to the central controller. The central controller thus detects that digital module A is plugged in. The first digital module A also places its data signal I/O ports in flow-through mode as discussed above.

Next, the central controller sends out a second data packet which has the "Assign ID" command in the second, third and fourth sub-channel data words, and the MFID incremented. The first sub-channel word has another command, such as assignment of an explicit ID code, intended for digital module A. Digital module A will receive command X and react to whatever it is. However, digital module A will now pass the packet downstream to digital module B (if attached). (Once a digital module receives an ID, it sends data through to the next module.) Digital module B now receives the packet and detects that the first instance of the "Assign ID" command in the packet is in the second sub-channel word. Digital module B thus detects that it is in the second position and henceforth will act on commands transmitted in the second sub-channel. Digital module B then sends an "Acknowledge ID" reply back to the central controller and places its data signal I/O ports in flow-through mode as discussed above. The central controller thus detects that digital module B is plugged in.

The process continues as the central controller sends out a third data packet which has the "Assign ID" command in the third and fourth sub-channel data words, and the MFID 608 is incremented. The first and second sub-channel words 604A, 604B have other commands X and Y intended for digital modules A and B, respectively. Digital modules A and B will receive commands X and Y and react to whatever they are. However, digital modules A & B pass the packet downstream to digital module C (if attached). Digital module C now receives the packet and detects that the first instance of the "Assign ID" command in the packet is in the third sub-channel word 604C. Digital module C thus detects that it is in the third position and henceforth will act on commands transmitted in the third sub-channel 604C. Digital module C then sends an "Acknowledge ID" reply back to the central controller and places its data signal I/O ports in flow-through mode as discussed above. The central controller thus detects that digital module C is plugged in.

The process continues until all digital modules detect their positions in the channel 450 and are assigned IDs. Likewise, the central controller knows how many modules are plugged in. Note that the central controller continues to send the "Assign ID" command on a sub channel until the central controller receives the requisite reply.

The preferred discovery process has a number of advantages to it.

First, the discovery process enables the "hot plugging" of additional digital modules. For example, consider a situation where digital modules A and B are plugged in. The central controller sends out data packets with the "Assign ID" commands in sub channel words three and four. If digital module C is plugged in it will receive the data stream that goes through digital modules A and B. Digital module C would see that the first instance of the "Assign ID" command is in the third sub-channel word so it detects that it is in the third position of the channel. The digital module C replies back to the central controller which thus detects digital module C. Hence, digital module C is attached and is assigned a unique ID.

Another advantage of the preferred discovery process is that it makes positions contingent on adjacent modules. For example, consider digital modules A, B and C plugged in. Digital module B cannot be unplugged without also unplugging digital module C from the channel. When the central controller does not receive data back from a module (i.e., when there is no reply packet in response to a given MFID), the central controller presumes that the corresponding digital module has been unplugged and changes the command on the corresponding sub-channel to "Assign ID". In the example, with digital modules B and C unplugged the central controller does not receive any replies and henceforth sends out data packets with the "Assign ID" command on the second through fourth sub channel words 604B, 604C and 604D.

The "Assign ID" command may include a unique identifier and a value (for example, four bits may be used for the command and four bits to transmit a unique ID). Alternatively, the unique ID may be carried in the corresponding sub-channel upon delivery of the next packet. In the still further alternative, as discussed above, the unique ID may be implied based on position by virtue of the discovery process which identifies for the central controller and the digital module the latter's position in the serial chain.

A digital servo module determines whether or not a standard servo unit is attached by sensing a pull down voltage on the data signal line of its output I/O port. If this condition is sensed and the digital servo module notices there are no central commands other than "Assign ID" on the adjacent corresponding downstream sub-channel word, the digital servo module presumes that a standard servo unit is attached.

3.4 Command Set and Status Codes

An implementation of a digital command set is discussed below. Table 1 lists various status states for the digital servo modules 100 and the digital LED modules 200.

A "Request Type" command requests a given digital module to report on its type, e.g., digital servo module or digital LED module. The reply packet transmitted by the digital module would report the type to the central controller.

A "Get Servo Position" command can request a given digital servo module to report the position of its associated servo motor. The reply packet transmitted by the digital servo would report the position to the central controller. In some implementations it may not be necessary for the central controller to transmit an explicit command requesting feedback on servo position; rather, the fact that the central controller has transmitted a servo position command implies that the digital servo module return servo position feedback.

A "Request Servo Torque" command can request a given digital servo module to report on the torque output of its associated servo motor. As discussed previously, each digital servo module includes a current sensor for sensing applied torque. The reply packet transmitted by the digital servo would report the torque to the central controller.

A "Get Servo Status" command can request a given digital servo module or LED module to report its internal status. The reply packet transmitted by the digital module would report the status to the central controller.

Each digital servo module autonomously sets an internal status condition along with the color of its associated LED. These status conditions and associated colors are outlined in Table 1. In this particular scheme, if the digital servo module is operating normally it sets its internal status condition to a particular value and sets the LED color to blue. Likewise, if the digital servo module is operating normally but connected to a slave standard servo unit the digital servo module sets its internal status condition to another predetermined value and sets the LED color to blue. If the digital servo module experiences a stall condition (the current sensor has detected a current spike), the digital servo module revises its internal

TABLE 1

Status Codes

| STATUS ID #: | STATUS BINARY: | STATUS CONDITION: | NOTES: | RGB LED Color: |
|---|---|---|---|---|
| 0 | 0000 | No Servo ID | The servo does not yet know who it is | YELLOW |
| 1 | 0001 | Low Power Mode | Servo is in Low Power mode | OFF |
| 2 | 0010 | Normal | All functions are normal | BLUE |
| 3 | 0011 | Normal + 1 | Servo is in Normal mode but it has a dumb servo attached to it | BLUE |
| 4 | 0100 | LIM Mode | servo is in LIM mode (motor disabled, RGB LED on, sending position data) | GREEN |
| 5 | 0101 | Stall Torque | Servo is experiencing a stall condition | RED |
| 6 | 0110 | Disabled | Servo experienced stall condition and is temporarily disabled | RED |

The commands can be implemented in a variety of ways. As most commands will typically be servo set position commands the address range of the sub-channel words can be segmented so that a portion of the range is reserved for explicit commands and the majority of the range for the implicit command of "Set Servo Position". For example, data values 0xFF to 0xF0 can be reserved for explicit commands (such as the "Assign ID" command discussed above). Data values 0xEF to 0x00 can be used for module position data. Thus, for example, 0xAA can correspond to the command "Set Servo Position" to relative position 0xAA within the pre-determined angular range (0x00-0xEF) of the digital servo. Using a single byte to communicate the desired servo position eliminates the need and the bandwidth required to transmit the standard servo 50 Hz pulse signal.

status condition and set its LED color to red. If the stall condition persists above a threshold time limit and/or the position sensor (potentiometer) does not show any further movement, the digital servo module will temporarily disable itself to prevent any physical damage, revises its internal status condition to reflect this condition, and sets the LED color to red. If the digital servo module has not yet received a ID code from the central controller the digital servo module sets its internal status condition to a particular value and sets the LED color to yellow. The digital servo can also be placed in a "LIM" mode as discussed in greater detail below. In this case, the digital servo module revises its internal status condition to reflect this condition and sets its associated LED color to green.

A "Set LED Color" command requests a given digital servo module or digital LED module to set the color of its associated LED. If the command is sent to a digital servo module and the color value is 0, the digital servo module sets the color of the LED autonomously based on its internal status as discussed above.

In some implementations the set color command may be transmitted over two packets 600. For example, one implementation utilizes the following scheme:
  (i) first byte=00gggrrr, where 00 signifies that this is first byte, ggg is a 3 bit value for green light intensity, and rrr is a 3 bit value for red light intensity
  (ii) second byte=01tttbbb, where 01 signifies that this is the second byte, ttt is a 3 bit value for the time to fade, and bbb is a 3 bit value for blue light intensity.
The ttt (time to fade) value is preset, not scaled, as follows:
000—0 seconds (no fade, change immediately)
001—200 ms (very very fast fade)
010—500 ms (very fast fade)
011—800 ms (fast fade)
100—1 second (normal fade)
101—2 seconds (slow fade)
110—3 seconds (very slow fade)
111—4 seconds (very very slow fade)

A "Set Servo Status" command instructs the indicated digital servo module to revise its internal status condition based on an explicit value transmitted by the central controller.

An "Acknowledge" command requests a quick acknowledge reply. This can be used to implement a periodic heartbeat protocol between the central controller and the digital modules when no other commands are required.

In some implementations, as most replies from the digital servo modules 100 will be servo position data, the address range of the reply data packet word 614 can be segmented so that a portion of the range is reserved for explicit return codes and the majority of the address range for the implicit feedback data on servo position. For example, in one implementation, 0xEF-0x00 is reserved for servo position data; 0xFF indicates that the servo is stalled, and 0xFA is confirmation code that the digital servo module is in LIM mode.

4.0 Control and Programming

The robotic system is intended for use as a toy and/or for the educational market where users may not have much or any prior programming experience. The system enables such persons to easily control any robotic figure constructed from a robotic kit.

4.1 Voice Recognition

A robotic kit will typically be delivered to the consumer with detailed instructions from the kit manufacturer for constructing a particular robotic figure, or such detailed instructions may be available through the manufacturer's web site. Robotic figures built from such instructions are referred to herein as "predetermined builds". For example, the robot 20 shown in FIG. 1 is a predetermined build. The central controller 400 may be provided with voice recognition software that will enable the user to control one or more predetermined builds based on predetermined voice commands which will trigger certain actions. In one implementation the central controller 400 can be placed in a voice recognition mode via the manually actuated switches 422. In this state, the central controller 400 listens for voice commands and responds to recognized voice commands. For example, the following voice commands trigger the associated consequent actions in the predetermined build of FIG. 1:

"Forward"—central controller powers both wheel modules 300A, 300B to move robot 20 forward "Backward"—central controller powers both wheel modules 300A, 300B to move robot 20 rearward "Left Turn"—central controller powers wheel module 300B for a predetermined time to move robot 20 leftward "Right Turn"—central controller powers wheel module 300A for a predetermined time to move robot 20 rightward "Turn Around"—central controller powers the wheel modules 300A, 300B forward and rearward for a predetermined time to turn robot 20 around "Dance"—central controller actuates various pivot actuators 10, controls the digital LED module 200 to illuminate the eye structure 78 with a predetermined light pattern, and plays a pre-recorded voice/sound track through the speaker 414 in accordance with a predetermined sequence to mimic a dance routine "Kung Fu"—central controller actuates various pivot actuators 10, controls the digital LED module 200 to illuminate the eye structure 78 with a predetermined light pattern, and plays a pre-recorded voice/sound track through the speaker 414 in accordance with a predetermined sequence to mimic a kung fu routine "List Commands"—central controller plays a pre-recorded voice/sound track through the speaker 414 to list pre-designated voice commands.

4.2 LIM Mode

The central controller and digital modules can be placed in a learning or LIM mode ("learned intelligent motion") in which the user can manually move the skeletal structures of the robotic figure and the central controller records the trajectory of all connected digital servo modules, digital LED modules, and digital wheel modules (if any), as well as contemporaneously recording any audio present whilst in LIM mode. (More specifically, a digital servo module trajectory is a temporal sequence of servo positions; a digital LED module trajectory is a temporal sequence of light pattern(s); and a digital wheel module trajectory is a temporal sequence of wheel positions or speed.) These trajectories and the audio can then be replayed. For example, the robot 20 shown in FIG. 1 can be placed in the LIM mode and made to roll forward whilst waving one of its arms. In the meantime, the user can vocalize an expression such as "Welcome home, I missed you". Upon termination of the LIM mode, the central controller 400 can thereafter play back the trajectories and the audio. (Unless the context dictates otherwise a collection of such trajectories, with or without accompanying audio, is referred to as an "animation".) If desired, the playback audio may be synthesized using a pre-designated distortion to replicate a unique voice for the robotic figure.

The central controller 400 is connected to a variety of switches 422, as discussed above. In one implementation, the switches 422 may be labeled as 'record', and 'play'. In this implementation the central controller 400 is configured to begin recording trajectories and audio upon actuation of the record button and cease recording upon subsequent actuation of the record button. Additionally or alternatively, the central controller may utilize voice recognition commands. For example, the record switch may be actuated but the recording start and stop is controlled by a voice command such as "start recording" and "stop recording". Various other input means may be provided as known in the art to place the robotic system into LIM mode.

Once engaged in LIM mode, the central controller sets the status of all digital servo modules to LIM mode (e.g., using the "Set Servo Status" command). In the LIM mode, each digital servo module is programmed to set the color of its associated LED to a predetermined color and periodically record the position of its servo motor. The position data is periodically transmitted to the central controller so that if the associated joint has been manually moved the trajectory (servo position over time) of the corresponding servo motor is reported to the central controller. In this manner the central controller builds a coordinated trajectory (servo positions over time) of all the position-controlled joints of the robotic figure. This data is captured in substantially real time and overlaid with the recorded audio to correlate the trajectory and audio.

In some implementations, the central controller 400 can also contemporaneously record the speed of the d.c motor 302 in the digital wheel module 300'. This information is processed by the central controller to generate a wheel module trajectory that is correlated to the coordinated digital servo module trajectories and audio timeline.

In playback, the central controller 400 replays the recorded digital servo and wheel module trajectories as well as audio in accordance with the recorded timeline.

In the foregoing embodiment each digital servo module periodically sends position data to the central controller which records the trajectory of the digital servo module. However, those skilled in the art will appreciate that in alternative embodiments each digital servo module can record its own trajectory and either upload the entire recorded trajectory to the central controller for subsequent playback or play the trajectory upon receipt of a specific playback command. In this alternative embodiment however, each digital servo module would need an internal timer or be synchronized to an external clock.

In some implementations, the trajectories and audio tracks recorded by the central controller during LIM mode can be saved in the flash memory 418 as an animation files and accorded a user-defined identification for future accessible and use. As will be discussed in greater detail below, these animation files can be recalled to string together a sequence of animations.

It should be appreciated that LIM mode programming can also be applied to robotic figures that are not predetermined builds, making it easy for those with limited programming experience to animate robotic builds according to their own imaginations. The LIM mode is particularly versatile in allowing the inexperienced user to readily and easily reconfigure a robotic figure and have the new configuration ready and usefully interacting with the user as soon as it is reconfigured.

4.3 Follow Mode

In a predetermined build the robotic system can be placed in a 'follow mode', which enables the user to grasp an appendage of the robotic figure and have it follow the user. For example, a person can hold hand 23 of the humanoid-like robot 20 shown in FIG. 1 and begin walking. In response, the robotic figure will follow the person.

In the follow mode the central controller sets the status of specific digital servo modules to LIM mode (using the "Set Servo Status" command). The affected digital servo modules send servo position data to the central controller. Thus, for example, if the robot hand 23 is moved upward and rightward/leftward about a median position such positional data is transmitted to the central controller. The central controller processes this information to derive a direction vector and controls the analog wheel modules 300A, 300B to move along the direction vector.

For example, in one implementation the current supplied to the analog wheel modules 300A, 300B is proportional to the height and outward angle of the robot upper arm 24. An implementation of a method for carrying out the follow mode is illustrated in the algorithm 700 of FIG. 11. In a step 702 of a first logic flow 700A the central controller 400 receives feedback on the present servo position associated with pivot actuator 10C. At a following step 704 the algorithm determines whether or not the present servo position exceeds a minimum threshold. If not, then the algorithm considers and that the user has not yet urged the robot 20 to follow it and returns to step 702. If yes, then at step 706 central controller sets the current supplied to the analog wheel modules 300A, 300B in proportion to a predetermined minimal amount plus an amount equal to:

$$\frac{p_a}{p_{max} - p_t} * (i_{max} - i_{min})$$

where $p_a$ is present servo position, $p_{max}$ is maximum servo position, $p_t$ is threshold servo position, $i_{max}$ is maximum current that can be supplied to the wheel motor, and $i_{min}$ is the minimum current required to move the robot 20. After step 706 the algorithm returns to step 702.

In an alternative implementation the current supplied to the analog wheel modules 300A, 300B can be a predetermined set amount. The current is turned on or triggered if the servo position associated with pivot actuator 10C exceeds a first threshold angle. The current can be turned off if the servo position is less than a second threshold angle, smaller than the first threshold angle, thus providing some hysteresis in the actuation angle.

In a step 712 of a parallel logic flow 700B the central controller 400 receives feedback on the present servo position associated with pivot actuator 10B. At a following step 714 the algorithm determines whether or not the present servo position is less than a first threshold value. If yes, then the algorithm considers that the user has urged the robot 20 leftward and follows step 716 wherein current is retarded to the analog wheel module 300B in proportion to the actual servo position relative to a servo position range indicative of a left turn. If not, then at step 718 the algorithm determines whether or not the present servo position is greater than a second threshold value. If yes, the algorithm considers that the user has urged the robot 20 rightward and follows step 720 wherein current is retarded to the analog wheel module 300A in proportion to the present servo position relative to a servo position range indicative of a right turn. If not, the algorithm returns to step 712. The algorithm also returns to step 712 after steps 716 or 720.

The follow mode provides a very inexperienced user such as a young child an intuitive way to interact with a robotic figure.

4.4 Applications Processor

In some implementations the robotic system can communicate with an applications processor such as a computer, tablet or smart phone that executes an app which can be used to control any robotic figure constructed from a system kit. The application processor can communicate with the central controller 400 through a wired connection such as through the USB port 406 or through a wireless connection such as a standard Bluetooth® connection. In some implementations, such as shown in FIG. 1, one of the building blocks can be a nest 26 sized to retain a smart phone (not shown). This allows for convenient tethering of the smartphone to the robotic figure, particularly where the smart phone is wired to the robotic figure.

4.4.1 Motion Capture

In some implementations the application processor may include a motion capture app which records a person's arm movements via an attached camera (e.g., smart phone camera) and processes the captured video images to obtain arm motion trajectory. This trajectory is then converted into servo position commands so that movement of a predetermined build mimics that of the captured video.

One example of a motion capture app is described with reference to user interface screens 730A-730E shown in FIGS. 13A-13E. As seen in FIG. 13A, when the motion capture app is initiated a user is instructed in screen 730A to align his or her body with a body template graphic 732. As seen in screen 730B of FIG. 13B, the motion capture app informs the user, for example through a text message 734, once the user has aligned his or her body with the template graphic 732. Next, as seen in screen 730 of FIG. 13C, the motion capture app requests the user to signal the app to begin tracking and recording the user's motion, for example, by requesting the user to issue a specific voice command such as that identified by text 736. The motion capture app also displays a servo trajectory timeline 740 and audio timeline 742. The motion capture app processes captured images of the user to develop a virtual skeletal model 744 (including skeletal segments 746) of the user corresponding to the predetermined build such that various segments of the user's anatomy are correlated to a virtual representation of one or more of the jointed skeletal structures of the predetermined build. For example, as shown in screen 730D of FIG. 13D, in some implementations the user's arm and head motion can be tracked to generate trajectories for the forearms 22, upper arm 24 and head 28 of the robotic figure 20 shown n FIG. 1. The motion capture app processes the virtual skeletal trajectories to generate servo trajectories 750 displayed in timeline 740 (each line in timeline 740 represents an individual servo trajectory) and records a contemporaneous audio recording 752 displayed in timeline 742. The user instructs the motion capture app to cease recording, for example, by a specific voice command such as that identified by text 754. Thereafter, as shown in screen 730E of FIG. 13E, the user may use an icon 756 to save an animation file which may thereafter be retrieved and played by the user through the application processor. On playback, the application processor utilizes the system digital command set to issue commands to the digital servo modules 100 to replicate the servo trajectories, and the central controller 400 transmits the commands to the digital servo modules. The audio recording may be played back through the application processor or transmitted to the central controller for contemporaneous playback through its speaker.

The motion capture app can preferably also be utilized in a real time mode wherein the trajectories may be played by the robotic figure in substantially real time as the person's arm movements are being captured and processed.

The motion capture function provides a simple and intuitive way to program a predetermined build, particularly for younger children or those with limited programming experience.

4.4.2 Virtual Remote Control

In some implementations the applications processor can execute a virtual remote app which enables a user to control a predetermined build by manipulating a virtual representation of the predetermined build. This can be used for immediate or direct control of the predetermined build, or as a means for those of limited programming experience to create an animation.

4.4.2.1 Direct Control

Figure 14:
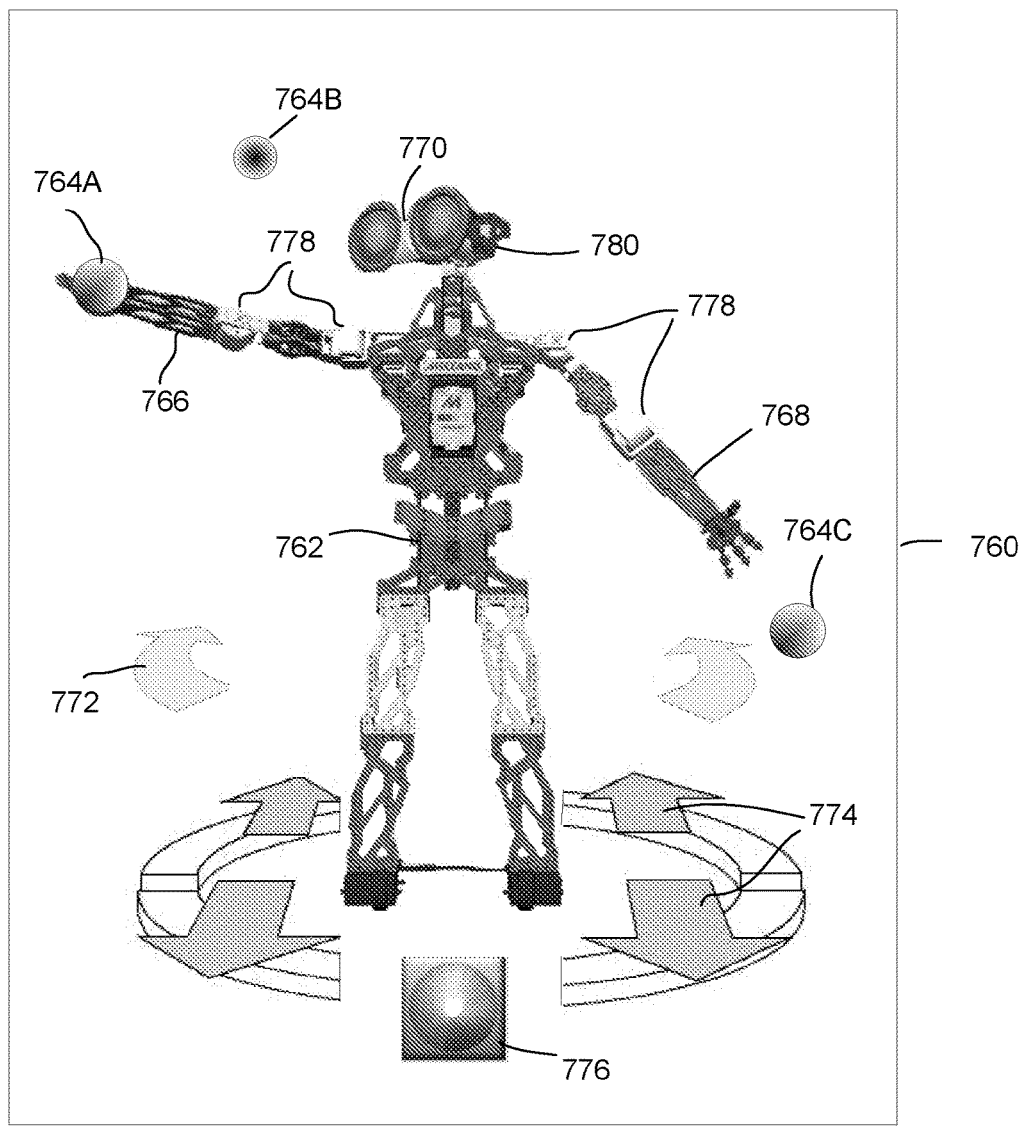
FIG. 14 is a screen shot associated with a virtual remote control application in which a robotic figure according to a predetermined build can be controlled in substantially real time by manipulating a virtual representation of the robotic figure.

An example of a direct control app is discussed with reference to user interface screen 760 of FIG. 14. The direct control app shows a virtual representation 762 of a predetermined build such as robot 20 of Figure along with a variety of cursors 764A-764C which enable the user to virtually manipulate the arms 766, 768 and head 770 of the virtual representation 762. The simulated motion is processed by the direct control app to generate substantially contemporaneous commands relayed through the central controller to position the digital servo modules 100 in a manner which substantially immediately replicates the motion of the arms 766, 768 and/or head 770. Icons 772 rotate the display so as to allow the user to more readily visualize and manipulate the virtual representation 762 in simulated three-dimensional space. Icons 774 control the analog wheel modules 300. More particularly, when the user touches one of these icons 774 the direct control app instructs the central controller 400 to move the corresponding analog wheel module to in the direction of the activated icon. The direct control app also enables the user to control the LED pattern of any digital servo module or digital LED module by allowing the user to first touch the corresponding virtual servo 770 or eye structure 780 and then activate icon 776 which will bring up a colour wheel that will enable the user to set the LED color and/or flash pattern. The direct control app instructs the central controller 400 to control the corresponding digital servo module LED 100-D1 or digital LED module LED 200-D1 so as to replicate the simulation.

4.4.2.2 Animation Builder

Figure 15:
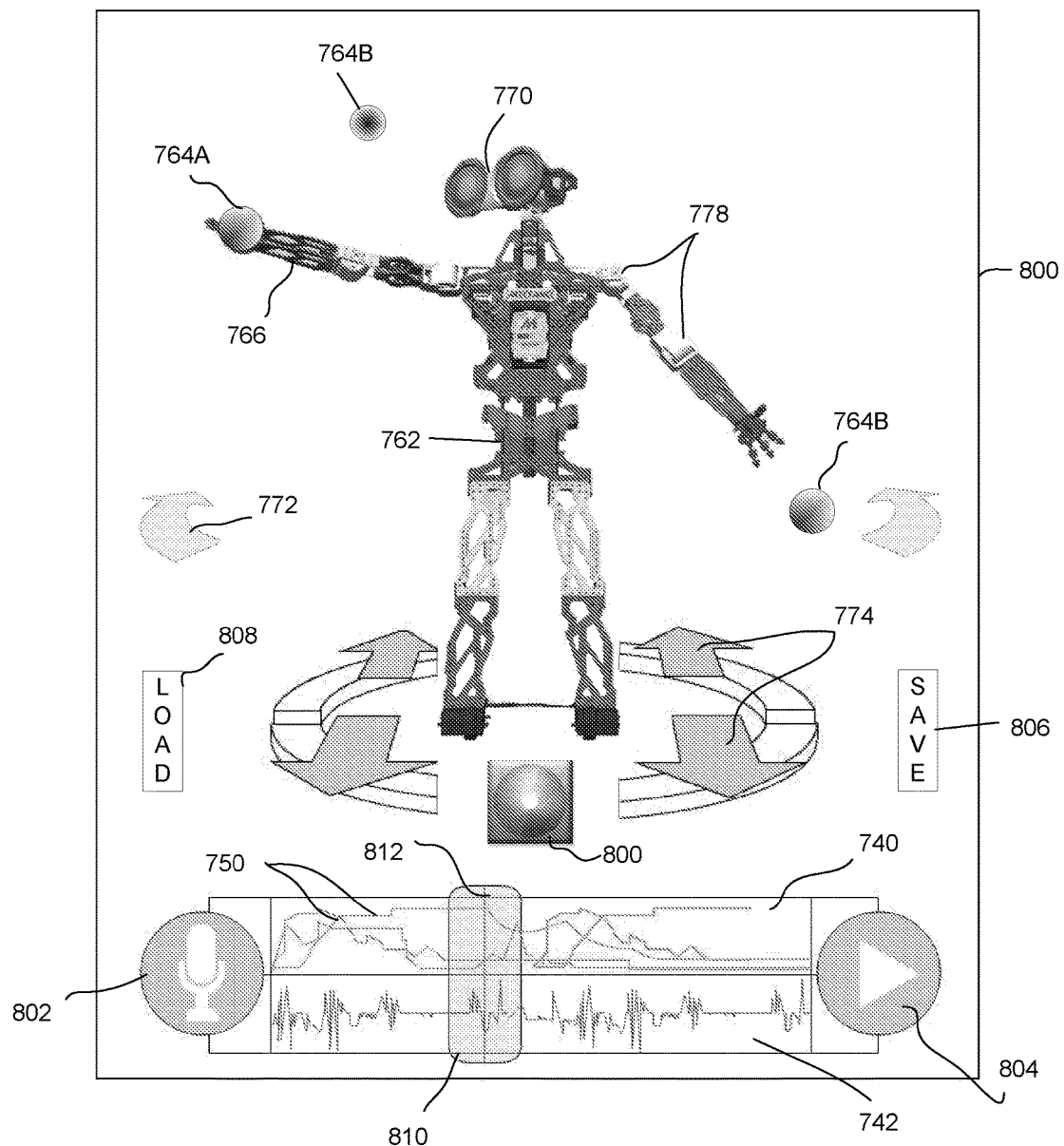
FIG. 15 is a screen shot associated with an animation builder application in which a robotic figure according to a predetermined build can be programmed by manipulating a virtual representation of the robotic figure.

An example of an animation builder app is discussed with reference to user interface screen 800 of FIG. 15. The user interface is similar to that shown in FIG. 14, with the addition of servo trajectory timeline 740 and audio timeline 742, which are associated with 'record' and 'play' icons 802 and 804, respectively to enable the user to record and play back, respectively, virtual arm 766, 768 and head 770 trajectories as the user manipulates the virtual representation 762 via the cursors 764A-764C as well as record any audio that may be present. The LEDs of any digital servo module or digital LED module can also be recorded as discussed previously. The resulting animation file may be saved, or another such file may be loaded, as indicated by 'save' and 'load' icons 806 and 808, respectively. An animation can also be edited by the user by moving a timeline cursor 810 to any point in the timeline, wherein the moveable skeletal elements of the virtual representation 762 are displayed in positions corresponding to the servo positions along time indicator 812. At this point the user may override a portion of the animation, for example, by moving arm 766, to generate new trajectories for the corresponding servos. This enables the user to combine separately recorded trajectories. Alternatively, the user may delete a portion of the animation by scrubbing the timeline cursor 810 (i.e., rapidly reciprocating the timeline cursor 810 to and fro), freeing up space to record a new portion of animation. In the event the virtual representation 762 is not positioned in exactly the same manner when the timeline is split the animation builder app supplies intervening servo trajectories to smoothly move between termination and commencement positions.

When the animation builder app plays an animation file the app animates the virtual representation 762 and transmits corresponding servo position and other control commands to the central controller, which controls the predetermined build accordingly.

4.4.2.3 Reconfigurable Avatar

As discussed previously, the user may reconfigure a predetermined build. For example, the robotic figure 20' shown in FIG. 3 is constructed from the predetermined build shown in FIG. 1. In some implementations the applications processor may include an avatar builder app which enables the user to design a virtual representation of the reconfigured robot, wherein the user-designed virtual representation can be used to directly control or generate an animation file to control the reconfigured robot.

The user-designed virtual representation of the reconfigured robot may be configured through a variety of design apps.

Figure 16:
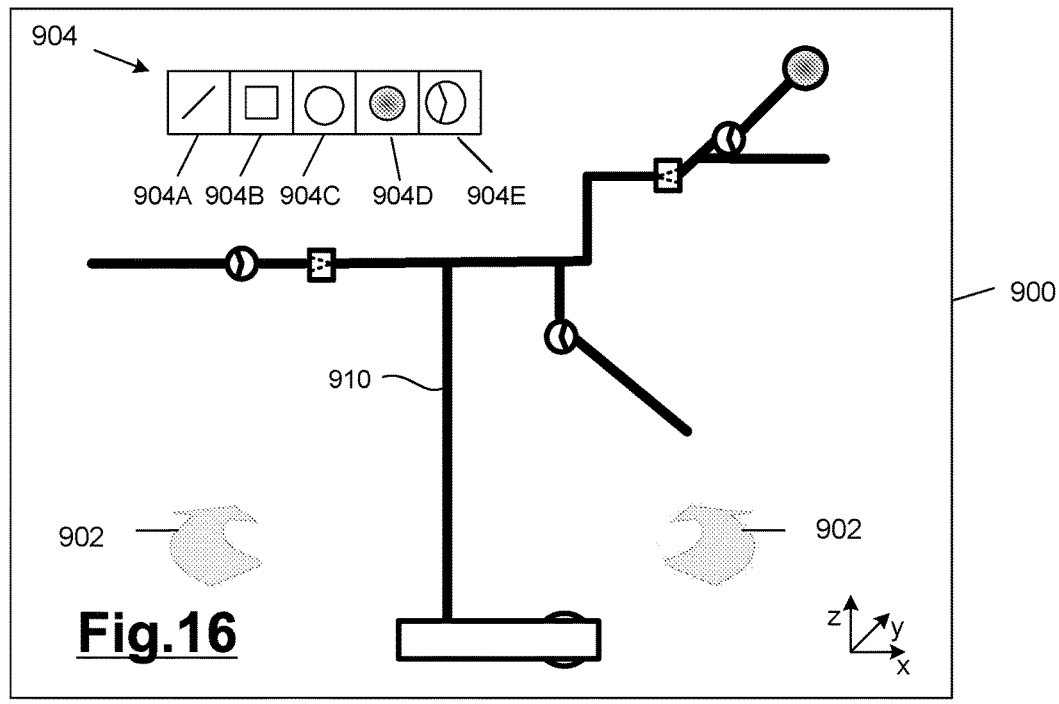
FIG. 16 is a screen shot associated with an avatar builder application which enables the user to design a virtual representation of a reconfigured robot, wherein the user-designed virtual representation can be used to directly control or generate an animation file to control the reconfigured robot.

In one implementation, the user can design a virtual representation of the reconfigured robot through the use of a 'stick' design app 900 such as shown in FIG. 16. This app 900 provides a number of icons which allow the user to draw a stick representation of the physical layout of the reconfigured robot in three-dimensional space. Icons 902 control the spatial orientation of the display screen. (Note that FIG. 16 as illustrated shows the display screen in only one plane.) Icons 904A, 904B, 904C represent static body elements such as lines, squares and circles that can be sized and connected together as well known in the field of drawing software to enable the user to create a stick drawing in proportion to and representative of the reconfigured robot. For example, stick drawing 910 shown in FIG. 16 mimics the essential skeletal structure of the robotic figure 20' shown in FIG. 3. Icons 904D, 904E represent the digital and/or analog modules such as digital servo module 100 and digital LED module 200. The app 900 enables the user to physically locate and orient the modules in the stick drawing 910. For example, the digital servo modules 100 have an operating range of motion and thus must be oriented relative to the body elements.

In another implementation, a conventional CAD app (not shown) can be used to allow the user to virtually construct the reconfigured robot from three-dimensional representations of individual elemental building blocks. This implementation can provide a comprehensive representation of the reconfigured robot but would likely require a greater investment of time to create the virtual representation.

In another implementation the user may take one or more pictures of the reconfigured robot and have an image processing app (not shown) identify the skeletal structures. The user may assist the image processing app by segmenting portions of the pictures. The image processing app may also identify the electronic modules and be assisted by the user in this process.

Figure 17:
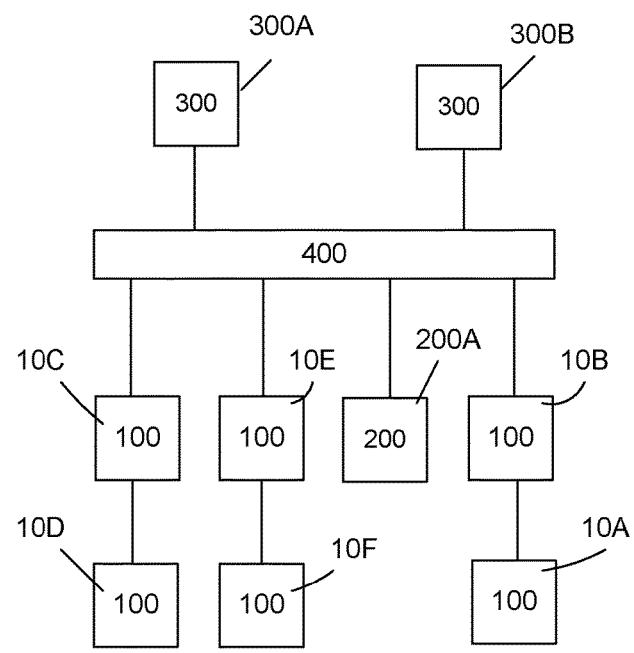
FIG. 17 is a schematic diagram showing an example of how electronic modules may be interconnected to the central controller in a reconfigured robotic figure.
Figure 18:
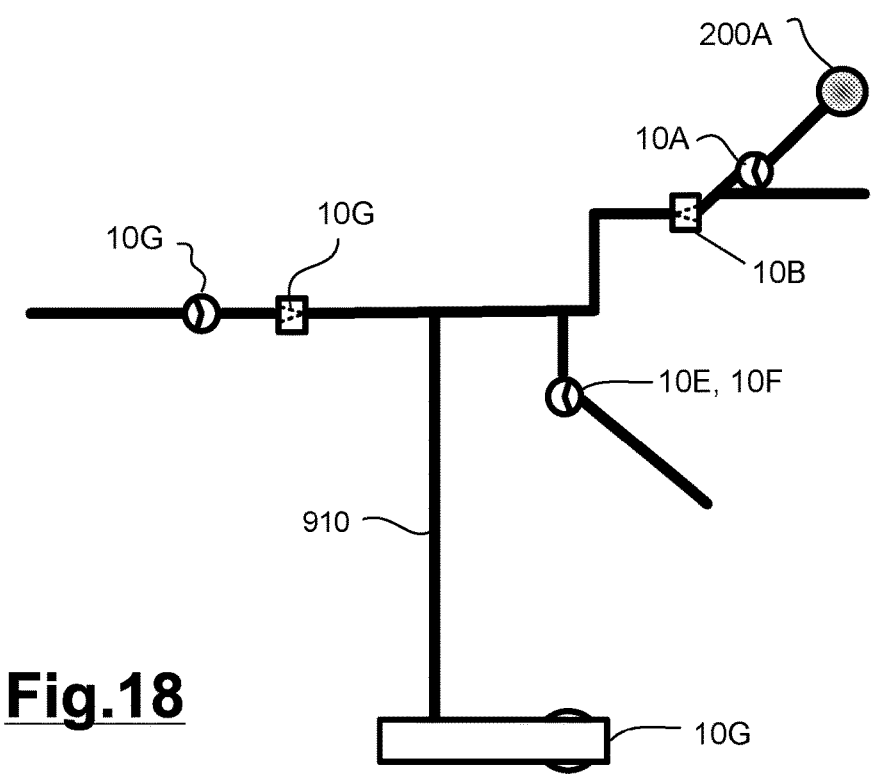
FIG. 18 is a schematic diagram showing the results of a correlation process wherein the individual electronic modules shown in FIG. 17 have been mapped to corresponding locations of the user-designed virtual representation shown in FIG. 16.

However implemented, the avatar builder app also has to correlate the user-designed virtual representation of the reconfigured robot with the electrical configuration of the electronic modules. For example, FIG. 17 shows how the electronic modules 100, 200, 300 may be interconnected to the central controller 400 in the reconfigured robotic figure 20' shown in FIG. 3. As discussed previously, the discovery process enables the central controller 400 to dynamically identify each individual digital module, for example, 10A, 10B, 10C, etc. In order to correlate each electronic module with the user-designed virtual representation, the avatar builder app can execute a process in which it indicates each electronic module to the user, for example by lighting the associated LED or briefly actuating the servomotor or dc motor, allowing the user to select the corresponding module in the user-designed virtual representation and thereby map the electrical structure to the physical structure. For example, FIG. 18 shows the results of a correlation process wherein the individual electronic modules 10A, 10B, 10C etc. shown in FIG. 17 have been mapped to corresponding physical locations in the stick drawing 910. The mapping process thus enables the animation builder app to control the appropriate electronic module so that virtual manipulations or settings of the user-designed virtual representation (such as stick drawing 910) are effected in the reconfigured robot.

The principles of the present invention are not limited to the specific examples as discussed with reference to the appended illustrations. It is possible to make other embodiments or practice other implementations that employ the principles hereof and that fall within the spirit and scope of the invention as defined by the appended claims.

The invention claimed is:

1. A reconfigurable robotic system, comprising:
   at least two digital servo modules, wherein each digital servo module includes a position-controlled motor and a position sensor for sensing a servo position;
   a plurality of elemental building blocks, the elemental building blocks being connected to the digital servo modules to construct a robotic figure having position-controlled joints, wherein the elemental building blocks are combinable with the digital servo modules to construct robotic figures of varying configurations; and
   a central controller communicating with the digital servo modules via a plurality of communication channels, each of which is subdivided into a plurality of sub-channels; wherein the central controller communicates with each given digital servo module via a respective sub-channel, and wherein the central controller periodically transmits a discovery signal in each sub-channel until a newly attached digital servo module transmits a reply to the discovery signal, at which time the central controller recognizes the presence of the newly attached digital servo module,
   wherein the central controller transmits servo position commands to the digital servo modules via the logical sub-channels and receives servo position feedback from the digital servo modules,
   and wherein the central controller is configured to set the digital servo modules in a learned motion mode, in which the position-controlled joints can be manually manipulated and in the process each of the selected digital servo modules periodically transmits servomotor position to the central controller which records a trajectory for each digital servo module,
   and wherein the central controller sends position commands to the digital servo modules in order to replay the recorded servo trajectories.

2. The reconfigurable robotic system according to claim 1, wherein:
   the central controller includes a microphone and a speaker;
   the central controller records audio in the learned motion mode;
   the audio is replayed in coordination with the replayed servo trajectories.

3. The reconfigurable robotic system according to claim 1, wherein each digital servo module includes an LED and each digital servo module autonomously sets the color of the LED in accordance with a predetermined internal status scheme.

4. The reconfigurable robotic system according to claim 3, wherein said LED colors indicate the following internal status: non-attached mode; normal mode; and learned motion mode.

* * * * *